US012570677B2

(12) United States Patent
Ono et al.

(10) Patent No.: US 12,570,677 B2
(45) Date of Patent: Mar. 10, 2026

(54) FLUORINE-CONTAINING ETHER COMPOUND, SURFACE TREATMENT AGENT, FLUORINE-CONTAINING ETHER COMPOSITION, COATING LIQUID, ARTICLE, AND PRODUCTION METHOD THEREOF

(71) Applicant: AGC Inc., Tokyo (JP)

(72) Inventors: Hikaru Ono, Chiyoda-ku (JP); Koki Watanabe, Chiyoda-ku (JP); Motoshi Aoyama, Chiyoda-ku (JP); Ryuta Takashita, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 870 days.

(21) Appl. No.: 17/805,554

(22) Filed: Jun. 6, 2022

(65) Prior Publication Data

US 2022/0298180 A1 Sep. 22, 2022

Related U.S. Application Data

(63) Continuation of application No. PCT/JP2020/046948, filed on Dec. 16, 2020.

(30) Foreign Application Priority Data

Dec. 26, 2019 (JP) ................................ 2019-235862

(51) Int. Cl.
*C07F 7/08* (2006.01)
*C09D 7/63* (2018.01)

(52) U.S. Cl.
CPC ................ *C07F 7/081* (2013.01); *C09D 7/63* (2018.01)

(58) Field of Classification Search
None
See application file for complete search history.

(56) References Cited

U.S. PATENT DOCUMENTS 6,127,498 A 10/2000 Tonelli et al.
6,183,872 B1 2/2001 Tanaka et al.
(Continued)

FOREIGN PATENT DOCUMENTS

CN 102471669 A 5/2012
EP 0 933 377 A2 8/1999
(Continued)

OTHER PUBLICATIONS

N. Yoshino et al., "Synthesis of Trimethoxy-type Silane Coupling Agents Containing Two Fluorocarbon Chains and Surface Modification of Glass", Journal of Japan Oil Chemists' Society, vol. 46, Issue 8, 1997, pp. 905-913 & 939 (with English Abstract).

*Primary Examiner* — Michael Forrest
(74) *Attorney, Agent, or Firm* — Oblon, McClelland, Maier & Neustadt, L.L.P.

(57) ABSTRACT

Provided are a fluorine-containing ether compound, a fluorine-containing ether composition, and a coating liquid, which can form a surface layer having excellent durability, and an article and production method thereof having a surface layer that has excellent durability and that can maintain water and oil repellency, lubricity, and fingerprint stain removability for a long time. The fluorine-containing ether compound includes a polyfluoropolyether chain, a reactive silyl group, and a linking group that includes a group represented by *—O—C(═O)—**, in which the linking group links the polyfluoropolyether chain arranged on the * side and the reactive silyl group arranged on the ** side.

7 Claims, 1 Drawing Sheet

(56) References Cited

U.S. PATENT DOCUMENTS

| | | | | |
|---|---|---|---|---|
| 6,200,684 | B1 | 3/2001 | Yamaguchi et al. | |
| 2009/0054687 | A1 | 2/2009 | Ikeda | |
| 2010/0129672 | A1 | 5/2010 | Hao et al. | |
| 2012/0077041 | A1 | 3/2012 | Yamane et al. | |
| 2012/0135252 | A1 * | 5/2012 | Kishikawa | C09D 183/16 428/448 |
| 2014/0287240 | A1 | 9/2014 | Murotani et al. | |
| 2014/0287246 | A1 | 9/2014 | Murotani et al. | |
| 2014/0302332 | A1 | 10/2014 | Murotani et al. | |
| 2015/0274889 | A1 | 10/2015 | Sakoh et al. | |
| 2015/0307719 | A1 | 10/2015 | Mitsuhashi et al. | |
| 2015/0315443 | A1 | 11/2015 | Takeda et al. | |
| 2016/0009929 | A1 | 1/2016 | Hoshino et al. | |
| 2016/0264788 | A1 | 9/2016 | Hoshino et al. | |
| 2016/0304665 | A1 | 10/2016 | Sakoh et al. | |
| 2016/0319071 | A1 | 11/2016 | Sakoh et al. | |
| 2016/0355638 | A1 | 12/2016 | Sakoh et al. | |
| 2017/0342210 | A1 | 11/2017 | Mitsuhashi et al. | |
| 2018/0142062 | A1 | 5/2018 | Hoshino et al. | |
| 2018/0148606 | A1 | 5/2018 | Hoshino et al. | |
| 2019/0002635 | A1 | 1/2019 | Mitsuhashi et al. | |
| 2019/0040266 | A1 | 2/2019 | Hoshino et al. | |
| 2019/0280459 | A1 | 9/2019 | Ishige et al. | |
| 2020/0002551 | A1 | 1/2020 | Mitsuhashi et al. | |
| 2020/0056067 | A1 | 2/2020 | Mitsuhashi et al. | |
| 2020/0071251 | A1 | 3/2020 | Hoshino et al. | |
| 2020/0157376 | A1 | 5/2020 | Hoshino et al. | |
| 2020/0165273 | A1 | 5/2020 | Hoshino et al. | |
| 2020/0165384 | A1 | 5/2020 | Hoshino et al. | |
| 2020/0165385 | A1 | 5/2020 | Uno et al. | |
| 2020/0231747 | A1 | 7/2020 | Furukawa et al. | |

FOREIGN PATENT DOCUMENTS

| | | | |
|---|---|---|---|
| JP | 09-255979 | A | 9/1997 |
| JP | 11-029585 | A | 2/1999 |
| JP | 2874715 | B2 | 3/1999 |
| JP | 2000-063797 | A | 2/2000 |
| JP | 2000-144097 | A | 5/2000 |
| JP | 2000-327772 | A | 11/2000 |
| JP | 2002-506887 | A | 3/2002 |
| JP | 2007-204586 | A | 8/2007 |
| JP | 2008-24759 | A | 2/2008 |
| JP | 2008-534696 | A | 8/2008 |
| JP | 4138936 | B2 | 8/2008 |
| JP | 2012-072272 | A | 4/2012 |
| JP | 2014-07016 | A | 4/2014 |
| JP | 2014-070163 | A | 4/2014 |
| JP | 2014-080473 | A | 5/2014 |
| JP | 2014-218639 | A | 11/2014 |
| JP | 2015-199906 | A | 11/2015 |
| JP | 6024816 | B2 | 11/2016 |
| JP | 2016-204656 | A | 12/2016 |
| JP | 2016-210854 | A | 12/2016 |
| JP | 2016-222859 | A | 12/2016 |
| JP | 2015/146861 | A1 | 4/2017 |
| JP | 2018-085493 | A | 5/2018 |
| JP | 2019-044158 | A | 3/2019 |
| WO | WO 99/037720 | A1 | 7/1999 |
| WO | WO 2006/107083 | A2 | 10/2006 |
| WO | WO 2009/008380 | A1 | 1/2009 |
| WO | WO 2011/016458 | A1 | 2/2011 |
| WO | WO 2011/059430 | A1 | 5/2011 |
| WO | WO 2011/060047 | A1 | 5/2011 |
| WO | WO 2012/064649 | A1 | 5/2012 |
| WO | WO 2013/042732 | A1 | 3/2013 |
| WO | WO 2013/121984 | A1 | 8/2013 |
| WO | WO 2013/121985 | A1 | 8/2013 |
| WO | WO 2013/121986 | A1 | 8/2013 |
| WO | WO 2013/172177 | A1 | 11/2013 |
| WO | WO 2014/126064 | A1 | 8/2014 |
| WO | WO 2014/163004 | A1 | 10/2014 |
| WO | WO 2015/087902 | A1 | 6/2015 |
| WO | WO 2015/146861 | A1 | 10/2015 |
| WO | WO 2017/022437 | A1 | 2/2017 |
| WO | WO 2017/038830 | A1 | 3/2017 |
| WO | WO 2017/038832 | A1 | 3/2017 |
| WO | WO 2017/187775 | A1 | 11/2017 |
| WO | WO 2018/079743 | A1 | 5/2018 |
| WO | WO 2018/143433 | A1 | 8/2018 |
| WO | WO 2018/216630 | A1 | 11/2018 |
| WO | WO 2019/039186 | A1 | 2/2019 |
| WO | WO 2019/039226 | A1 | 2/2019 |
| WO | WO 2019/039341 | A1 | 2/2019 |
| WO | WO 2019/044479 | A1 | 3/2019 |
| WO | WO 2019/163282 | A1 | 8/2019 |

* cited by examiner

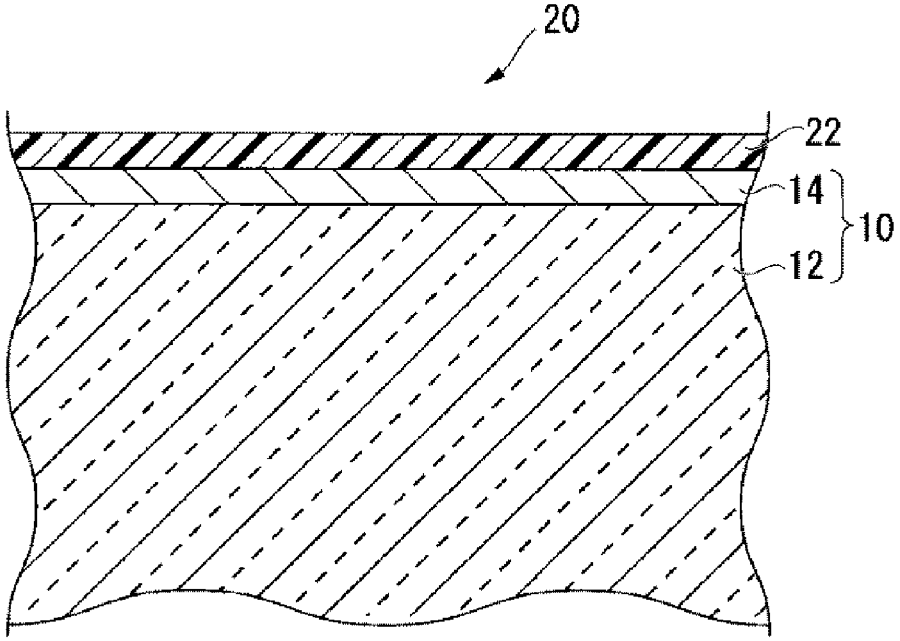
20
22
14
10
12

FLUORINE-CONTAINING ETHER COMPOUND, SURFACE TREATMENT AGENT, FLUORINE-CONTAINING ETHER COMPOSITION, COATING LIQUID, ARTICLE, AND PRODUCTION METHOD THEREOF

INCORPORATION BY REFERENCE

This application is based upon and claims the benefit of priority from Japanese Patent Application 2019-235862 filed on Dec. 26, 2019, and PCT application No. PCT/JP2020/046948 filed on Dec. 16, 2020, the disclosure of which is incorporated herein in its entirety by reference.

BACKGROUND

The present invention relates to a fluorine-containing ether compound, a surface treatment agent, a fluorine-containing ether composition, a coating liquid, an article, and a production method thereof.

Fluorine-containing ether compounds having a fluoropolyether chain and a hydrolyzable silyl group are drawing attention due to their ability to confer excellent water and oil repellency, abrasion resistance, reduced fingerprint adhesion, fingerprint stain removability, and lubricity imparted to the surface of a substrate. Such fluorine-containing ether compounds can form a surface layer exhibiting such properties on the surface of a substrate, and therefore are suitably used for a surface treatment agent.

For example, as a fluorine-containing ether compound capable of forming a durable surface layer having excellent fingerprint stain removability on the surface of a substrate, International Patent Publication No. WO 2017/038832 proposes a fluorine-containing ether compound having a perfluoropolyether chain and a hydrolyzable silyl group.

SUMMARY

The fluorine-containing ether compound and the like described in International Patent Publication No. WO 2017/038832 is described as having high wear durability. However, there is an increasing demand for even better wear resistance durability, and there is a need for a surface treatment agent that exhibits better wear resistance.

It is an object of the present invention to provide a fluorine-containing ether compound, a surface treatment agent, a fluorine-containing ether composition, and a coating liquid, which can form a surface layer having excellent durability, and an article and production method thereof having a surface layer that has excellent durability and that can maintain water and oil repellency, lubricity, and fingerprint stain removability for a long time.

The present invention provides a fluorine-containing ether compound, a production method thereof, a surface treatment agent, a fluorine-containing-compound-containing composition, a coating liquid, an article, and a production method thereof, described in the following [1] to [9].

[1] A fluorine-containing ether compound comprising:

a polyfluoropolyether chain;

a reactive silyl group; and a linking group including a group represented by *—O—C(=O)—**, in which the linking group links the polyfluoropolyether chain arranged on the * side and the reactive silyl group arranged on the ** side.

[2] The fluorine-containing ether compound according to [1], in which the linking group includes a group represented by *—$R^1$—O—C(=O)—**, and $R^1$ is an alkylene group having 1 to 10 carbon atoms optionally having a substituent (other than a fluorine atom).

[3] A fluorine-containing ether compound represented by the following formula 1, $$R^f[-R^1-O-C(=O)-Q^1\{-T\}_g]_j \quad \text{Formula 1}$$

in which $R^f$ is a polyfluoropolyether chain in which at least one fluorine atom is bonded to a carbon atom bonded to $R^1$, $R^1$ is an alkylene group having 1 to 10 carbon atoms optionally having a substituent (other than a fluorine atom), and a plurality of $R^1$ may be the same or different, $Q^1$ is a (g+1)-valent organic group having a carbon atom or nitrogen atom bonded to —O—C(=O)— in formula 1, and when there are a plurality of $Q^1$, the plurality of $Q^1$ may be the same or different, T is —$Si(R)_{3-a}(L)_a$, and when there are two or more T, the two or more T may be the same or different, R is an alkyl group, L is a hydrolyzable group or a hydroxyl group, and two or more L in T may be the same or different, a is 2 or 3, g is an integer of 1 or more, and when there are a plurality of g, the plurality of g may be the same or different, and j is 1 or 2.

[4] The fluorine-containing ether compound according to [3], wherein $Q^1$ is represented by any of the following formulas (Q1) to (Q7):

Formula (Q1)

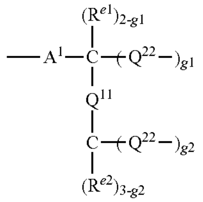

$$-A^1-C(R^{e2})_{3-g3}(-Q^{22}-)_{g3} \quad \text{Formula (Q2)}$$

$$-A^2-N(-Q^{23}-)_2 \quad \text{Formula (Q3)}$$

$$-A^3-Z^1(-Q^{24}-)_{g4} \quad \text{Formula (Q4)}$$

$$-A^2-Si(R^{e3})_{3-g3}(-Q^{25}-)_{g3} \quad \text{Formula (Q5)}$$

$$-A^1-Q^{26}- \quad \text{Formula (Q6)}$$

$$-A^1-CH(-Q^{22}-)-Si(R^{e3})_{3-g5}(-Q^{25}-)_{g5} \quad \text{Formula (Q7)}$$

in formulas (Q1) to (Q7), the $A^1$, $A^2$, or $A^3$ side is linked to —O—C(=O)— in formula 1, and the $Q^{22}$, $Q^{23}$, $Q^{24}$, $Q^{25}$, or $Q^{26}$ side is linked to T, $A^1$ is a single bond, an alkylene group, or a group having —C(O)N$R^{e6}$—, —C(O)—, —N$R^{e6}$—, or —O— between carbon-carbon atoms of an alkylene group having two or more carbon atoms, $A^2$ is an alkylene group or a group having —C(O)NR$^{e6}$—, —C(O)—, —NR$^{e6}$—, or —O— between carbon-carbon atoms of an alkylene group having two or more carbon atoms, $A^3$ is $A^1$ when the atom in $Z^1$ to which $A^3$ is bonded is a carbon atom, and is $A^2$ when the atom in $Z^1$ to which $A^3$ is bonded is a nitrogen atom, $Q^{11}$ is a single bond, —O—, an alkylene group, a group having —C(O)NR$^{e6}$—, —C(O)—, —NR$^{e6}$—, or —O— between carbon-carbon atoms of an alkylene group having two or more carbon atoms, $Q^{22}$ is an alkylene group, a group having —C(O)NR$^{e6}$—, —C(O)—, —NR$^{e6}$—, or —O— between carbon-carbon atoms of an alkylene group having two or more carbon atoms, a group having —C(O)NR$^{e6}$—, —C(O)—, —NR$^{e6}$—, or —O— at an end on the side not linked to the T of the alkylene group, or a group having —C(O)NR$^{e6}$—, —C(O)—, —NR$^{e6}$—, or —O— between carbon-carbon atoms of an alkylene group having two or more carbon atoms and having —C(O)NR$^{e6}$, —C(O)—, —NR$^{e6}$—, or —O— at an end on the side not linked to the T of the alkylene group, and when $Q^1$ has two or more $Q^{22}$, the two or more Q22 may be the same or different, $Q^{23}$ is an alkylene group or a group having —C(O)NR$^{e6}$—, —C(O)—, —NR$^{e6}$—, or —O— between carbon-carbon atoms of an alkylene group having two or more carbon atoms, and the two $Q^{23}$ may be the same or different, $Q^{24}$ is $Q^{22}$ when the atom in $Z^1$ to which $Q^{24}$ is bonded is a carbon atom, is $Q^{23}$ when the atom in $Z^1$ to which $Q^{24}$ is bonded is a nitrogen atom, and when $Q^1$ has two or more $Q^{24}$, the two or more Q24 may be the same or different, $Q^{25}$ is an alkylene group or a group having —C(O)NR$^{e6}$—, —C(O)—, —NR$^{e6}$—, or —O— between carbon-carbon atoms of an alkylene group having two or more carbon atoms, and when $Q^1$ has two or more $Q^{25}$, the two or more Q25 may be the same or different, $Q^{26}$ is an alkylene group or a group having —C(O)NR$^{e6}$—, —C(O)—, —NR$^{e6}$—, or —O— between carbon-carbon atoms of an alkylene group having two or more carbon atoms, $Z^1$ is a (g4+1)-valent group having a ring structure having a carbon atom or nitrogen atom to which $A^3$ is directly bonded and a carbon atom or nitrogen atom to which $Q^{24}$ is directly bonded, $R^{e1}$ is a hydrogen atom or an alkyl group, and when $Q^1$ has two or more $R^{e1}$ the two or more $R^{e1}$ may be the same or different, $R^{e2}$ is a hydrogen atom, a hydroxyl group, an alkyl group, or an acyloxy group, $R^{e3}$ is an alkyl group, $R^{e6}$ is a hydrogen atom, an alkyl group having 1 to 6 carbon atoms, or a phenyl group, g1 is an integer from 0 to 3, g2 is an integer from 0 to 3, and g1+g2 is an integer from 1 to 6, g3 is an integer from 1 to 3, g4 is an integer greater than or equal to one, and g5 is an integer from 0 to 3.

[5] A surface treatment agent comprising the fluorine-containing ether compound according to any of [1] to [4].

[6] A fluorine-containing ether composition comprising:

one or more of the fluorine-containing ether compounds according to any of [1] to [4]; and an additional fluorine-containing ether compound.

[7] A coating liquid comprising:

the fluorine-containing ether compound according to any of [1] to [4] or the fluorine-containing ether composition according to [6]; and a liquid medium.

[8] An article comprising a surface layer formed from the fluorine-containing ether compound according to any of [1] to [4] or the fluorine-containing ether composition according to [6].

[9] A method for producing an article, comprising forming a surface layer by a dry coating method or a wet coating method using the fluorine-containing ether compound according to any of [1] to [4], the fluorine-containing ether composition according to [6], or the coating liquid according to [7].

The above and other objects, features and advantages of the present disclosure will become more fully understood from the detailed description given hereinbelow and the accompanying drawings which are given by way of illustration only, and thus are not to be considered as limiting the present disclosure.

The present invention provides a fluorine-containing ether compound, a surface treatment agent, a fluorine-containing ether composition, and a coating liquid, which can form a surface layer having excellent durability, and an article and production method thereof having a surface layer that has excellent durability and that can maintain water and oil repellency, lubricity, and fingerprint stain removability for a long time

BRIEF DESCRIPTION OF THE DRAWINGS

FIG. 1 is a schematic cross-sectional view showing an example of the article of the present invention.

DESCRIPTION OF EMBODIMENTS

The meaning of the following terms in the present specification is as follows.

In the present specification, the compound represented by formula 1A is designated as compound 1A. The compounds represented by the other formulas are also written in the same way.

Further, the group represented by formula g1a is designated as group g1a. The groups represented by the other formulas are also written in the same way.

"Oxyfluoro(cyclo)alkylene" is a generic term for oxyfluoroalkylene and oxyfluorocycloalkylene.

"Reactive silyl group" is a generic term for hydrolyzable silyl groups and silanol groups (Si—OH).

"Hydrolyzable silyl group" means a group that can hydrolyze to form a silanol group.

"Surface layer" means a layer formed at the surface of a substrate.

If the fluorine-containing ether compound is a mixture of a plurality of fluorine-containing ether compounds having different chain lengths of the polyfluoropolyether chain, the "molecular weight" of the polyfluoropolyether chain is a number average molecular weight calculated by determining the number (average value) of oxyfluoro(cyclo)alkylene units based on the end groups, by $^1$H-NMR and $^{19}$F-NMR.

The word "to" when used to indicate a numerical range means that the numerical value described before and the numerical value described after that are included as the lower limit value and the upper limit value.

[Fluorine-Containing Ether Compound]

The fluorine-containing ether compound of the present invention (hereinafter referred to as "the present compound") has a polyfluoropolyether chain, a reactive silyl group, and a linking group including a group represented by *—O—C(═O)—**, in which the polyfluoropolyether chain arranged on the * side and the reactive silyl group arranged on the ** side are linked via the linking group.

The present compound has a polyfluoropolyether chain. The compound having a polyfluoropolyether chain has excellent fingerprint stain removability of the surface layer.

The present compound is a compound having excellent chemical stability in which the hydrolysis reaction of the ester moiety is suppressed by arranging the oxygen atom of the ester bond included in the linking group on the polyfluoropolyether chain side.

The polyfluoropolyether chain is a group having two or more oxyfluoro(cyclo)alkylene units. Examples of the polyfluoropolyether chain include $R^{f1}$ in formula 1 described later. As the polyfluoropolyether chain, a perfluoropolyether chain is preferable from the viewpoint that the abrasion resistance and fingerprint stain removability of the surface layer are even better.

The polyfluoropolyether chain in the present invention may have a fluorine ring structure optionally having a hetero atom.

In the case of a monovalent polyfluoropolyether chain, the polyfluoropolyether chain has either one or both of a monovalent fluorine-containing ring structure at a free end and a divalent fluorine-containing ring structure in the middle of the main chain.

In the case of a divalent polyfluoropolyether chain, the polyfluoropolyether chain has a divalent fluorine-containing ring structure in the middle of the main chain.

The polyfluoropolyether chain has a fluorine-containing ring structure, and so as a result it has excellent chemical resistance and is excellent in various durability aspects such as light resistance.

The fluorine-containing ring structure is, from the viewpoint that the present compound is easy to produce, preferably a 3 to 8-member ring, and from the viewpoint that the abrasion resistance and anti-slip properties of the surface layer are even better, more preferably a 4 to 6-member ring, and particularly preferably a four-member ring. Details of the ring structure will be described later.

Here, "free end" means that in the polyfluoropolyether chain, the reactive silyl group is an end that is not bonded via the linking group. Further, "monovalent fluorine-containing aliphatic ring structure at a free end" means a ring structure in which one of the carbon atoms constituting the fluorine-containing aliphatic ring is a carbon atom that is at the end of the main chain of the polyfluoropolyether chain and is at the end on the side not bonded to the linking group.

As the linking group, among them, it is preferable to include a group represented by *—$R^1$—O—C(═O)—** (in which $R^1$ is an alkylene group having 1 to 10 carbon atoms optionally having a substituent other than a fluorine atom). By not having a fluorine atom in the carbon atoms bonded to the oxygen atom side of the ester bond, chemical stability is improved and a hydrolysis reaction is suppressed. The alkylene group of $R^1$ is preferably an alkylene group having 1 to 6 carbon atoms, more preferably an alkylene group having 1 to 3 carbon atoms, further preferably a methylene group or an ethylene group, and particularly preferably a methylene group. Examples of the substituent that $R^1$ optionally has include an alkyl group, an aryl group, an alkoxy group, a hydroxyl group, and the like that optionally have a hetero atom.

The alkyl group is preferably an alkyl group having 1 to 6 carbon atoms, and examples include a methyl group, an ethyl group, a propyl group, an n-butyl group, a tert-butyl group, and a cyclohexyl group. Examples of the hetero atom between carbon-carbon atoms of the alkyl group include an oxygen atom, a nitrogen atom, a sulfur atom, a silicon atom, and the like. In addition, the alkyl group optionally has a further substituent. Examples of the substituent that the alkyl group optionally has include a halogen atom, a hydroxyl group, a hydrolyzable silyl group, an aryl group, and the like.

Examples of the aryl group include a carbon ring such as a phenyl group and a naphthyl group, and a heterocyclic ring such as a pyridyl group. Examples of the substituent that the aryl group optionally has include a halogen atom, a hydroxyl group, a hydrolyzable silyl group, an alkyl group, and the like. Examples of the hydrolyzable silyl group include the same examples as described later with regard to T.

$R^1$ is preferably a straight chain alkylene group that does not have a substituent from the viewpoint of chemical stability and ease of production.

The present compound preferably has a structure represented by the following formula 1 from the viewpoint of obtaining a surface layer that has excellent chemical stability and that can maintain water and oil repellency, lubricity, and fingerprint stain removability for a long time.

$$R^f[—R^1—O—C(═O)\text{-}Q^1\{\text{-}T\}_g]_j \quad \text{Formula 1}$$

In the formula, $R^f$ is a polyfluoropolyether chain in which at least one fluorine atom is bonded to a carbon atom bonded to $R^1$, $R^1$ is an alkylene group having 1 to 10 carbon atoms optionally having a substituent (other than a fluorine atom), and a plurality of $R^1$ may be the same or different, $Q^1$ is a (g+1)-valent organic group having a carbon atom bonded to —O—C(═O)— in formula 1, and when there are a plurality of $Q^1$, the plurality of $Q^1$ may be the same or different, T is —$Si(R)_{3-a}(L)_a$, and when there are two or more T, the two or more T may be the same or different, R is an alkyl group, L is a hydrolyzable group or a hydroxyl group, and two or more L in T may be the same or different, a is 2 or 3, g is an integer of 1 or more, and when there are a plurality of g, the plurality of g may be the same or different, and j is 1 or 2.

The present compound (compound 1) represented by formula 1 is a compound having a "monovalent polyfluoropolyether chain-linking group-reactive silyl group" structure (when j=1), or a compound having a "reactive silyl group-linking group-divalent polyfluoropolyether chain-linking group-reactive silyl group" structure (when j=2).

Compound 1 has a reactive silyl group at least at one end. The present compound having a reactive silyl group at the end has a chemically bonds firmly with the substrate, and therefore the surface layer has excellent abrasion resistance.

When j=1, formula 1 is represented by the following formula 1A. Further, when j=2, formula 1 is represented by the following formula 1B.

$$R^{fa}—R^1—O—C(═O)\text{-}Q^1\{\text{-}T\}_j \quad \text{Formula 1A}$$

$$\{T\}_g\text{-}Q^1\text{-}C(═O)—O—R^1—R^{fb}—R^1—O—C(═O)\text{-}Q^1\{\text{-}T\}_g \quad \text{Formula 1B}$$

In the formulas, $R^{fa}$ is a monovalent polyfluoropolyether chain, and $R^{f}$ is a divalent polyfluoropolyether chain, and both $R^{fa}$ and $R^{f}$ correspond to $R^{f}$ in formula 1. The other symbols are the same as the symbols in formula 1.

$R^{fa}$ is a monovalent polyfluoropolyether chain. As $R^{fa}$, a monovalent perfluoropolyether chain is more preferable from the viewpoint that the abrasion resistance and fingerprint stain removability of the surface layer are even better.

$R^{fb}$ is a divalent polyfluoropolyether chain. As $R^{fb}$, a divalent perfluoropolyether chain is more preferable from the viewpoint that the abrasion resistance and the fingerprint stain removability of the surface layer are even better.

The molecular weight of the monovalent or divalent polyfluoropolyether chain is, from the viewpoint of achieving both fingerprint stain removability and anti-slip properties of the surface layer, and the viewpoint of chemical resistance, preferably 50 to 1000, more preferably 100 to 900, and particularly preferably 200 to 800. If the molecular weight of the polyfluoropolyether chain is greater than or equal to the lower limit value of this range, the fingerprint stain removability of the surface layer is even better. If the molecular weight of the polyfluoropolyether chain is less than or equal to the upper limit value of this range, the anti-slip properties of the surface layer are even better.

The molecular weight of the polyfluoropolyether chain is, from the viewpoint of even better fingerprint stain removability and abrasion resistance of the surface layer, and the viewpoint of chemical resistance, preferably 1500 to 10000, more preferably 2000 to 8000, and particularly preferably 2500 to 6000. If the molecular weight of the polyfluoropolyether chain is greater than or equal to the lower limit of this range, the abrasion resistance and fingerprint stain removability of the surface layer are even better. If the molecular weight of the polyfluoropolyether chain is less than or equal to the upper limit value of this range, the abrasion resistance of the surface layer is even better.

Examples of $R^{fa}$ include the group g1a.

$$R^{f1}—(OR^{f2})_{m1}—(O)_{n1}— \quad \text{Formula g1a}$$

In the formula, $R^{f1}$ is a fluoroalkyl group having 1 to 20 carbon atoms or a monovalent fluorinated hydrocarbon group having a fluorine-containing aliphatic ring structure. $R^{f2}$ is a fluoroalkylene group having 1 to 6 carbon atoms or a divalent fluorinated hydrocarbon group having a fluorine-containing aliphatic ring structure. m1 is an integer of 0 to 500. When m1 is 2 or more, $(OR^{f2})_{m1}$ may consist of two or more kinds of $OR^{f2}$. n1 is 0 or 1.

Examples of $R^{fb}$ include a group having the group g1b. The group g1b has one or more fluorine-containing aliphatic ring structures.

$$—(R^{f3})_{n2}—(OR^{f2})_{m2}—(O)_{n3}— \quad \text{Formula g1b}$$

In the formula, $R^{f2}$ and $R^{f3}$ are each independently a fluoroalkylene having 1 to 6 carbon atoms or a divalent fluorinated hydrocarbon group having a fluorine-containing aliphatic ring structure. m2 is an integer of 0 to 500. When m2 is 2 or more, $(OR^{f2})_{m}$ may consist of two or more kinds of $OR^{f2}$. n2 and n3 are each independently 0 or 1. However, n2+m2 is 1 or more.

If the fluoroalkyl group of $R^{f1}$ has 1 to 20 carbon atoms, the abrasion resistance and the fingerprint stain removability of the surface layer are even better. From the viewpoint that the abrasion resistance and fingerprint stain removability of the surface layer are even better, the $R^{f1}$ fluoroalkyl group preferably has 1 to 6 carbon atoms, more preferably 1 to 4 carbon atoms, and particularly preferably 1 to 3 carbon atoms.

From the viewpoint of having even better abrasion resistance and fingerprint stain removability of the surface layer, the $R^{f1}$ fluoroalkyl group is preferably a perfluoroalkyl group. A compound 1A in which $R^{f1}$ is a perfluoroalkyl group has a $CF_3$— at an end. When the compound 1A has a $CF_3$— at an end, a surface layer having a low surface energy can be formed, so that the abrasion resistance and fingerprint stain removability of the surface layer are even better.

Examples of the $R^{f1}$ fluoroalkyl group include $CF_3$—, $CF_3CF_2$—, $CF_3CF_2CF_2$—, $CF_3CF_2CF_2CF_2$—, $CF_3CF_2CF_2CF_2CF_2$—, and $CF_3CF_2CF_2CF_2CF_2CF_2$—, and $CF_3CF(CF_3)$—.

The number of carbon atoms of the monovalent fluorinated hydrocarbon group having a fluorine-containing aliphatic ring structure of $R^{f1}$ is preferably 3 to 20, more preferably 4 to 8, and particularly preferably 4 to 6. If the number of carbon atoms of the fluorinated hydrocarbon group is within the above range, the abrasion resistance and fingerprint stain removability of the surface layer are even better.

The fluorinated hydrocarbon group of $R^{f1}$ is preferably a fluorocycloalkyl group from the viewpoint that the surface layer has even better anti-slip properties.

The fluorinated hydrocarbon group of $R^{f1}$ is preferably a fully fluorinated hydrocarbon group is from the viewpoint that the abrasion resistance and fingerprint stain removability of the surface layer are even better.

Examples of the fluorinated hydrocarbon group of $R^{f1}$ include the monovalent fluorine-containing aliphatic ring structure exemplified in the above formula.

When the number of carbon atoms of the fluoroalkylene group of $R^{f2}$ or $R^{f3}$ is 1 to 6, the abrasion resistance and fingerprint stain removability of the surface layer are even better.

The fluoroalkylene group of $R^{f2}$ or $R^{f3}$ is preferably a straight chain fluoroalkylene group from the viewpoint that the abrasion resistance and fingerprint stain removability of the surface layer are even better.

The fluoroalkylene group of $R^{f2}$ or $R^{f3}$ is preferably a perfluoroalkylene group from the viewpoint that the abrasion resistance and fingerprint stain removability of the surface layer are even better.

The proportion of perfluoroalkylene groups with respect to all $R^{f2}$ is, from the viewpoint that the abrasion resistance and fingerprint stain removability of the surface layer are even better, preferably 60 mol % or more, more preferably 80 mol % or more, and is particularly preferably 100 mol %.

The number of carbon atoms of the divalent fluorinated hydrocarbon group having a fluorine-containing aliphatic ring structure of $R^{f2}$ or $R^{f3}$ is preferably 3 to 20, more preferably 4 to 8, and particularly preferably 4 to 6. When the number of carbon atoms of the fluorinated hydrocarbon group is within the above range, the abrasion resistance and fingerprint stain removability of the surface layer are even better.

The fluorinated hydrocarbon group of $R^{f2}$ or $R^{f3}$ is preferably a fluorocycloalkylene group from the viewpoint that the anti-slip properties of the surface layer are even better.

The fluorinated hydrocarbon group of $R^{f2}$ or $R^{f3}$ is preferably a fully fluorinated hydrocarbon group from the viewpoint that the abrasion resistance and fingerprint stain removability of the surface layer are even better.

Examples of the fluorinated hydrocarbon group of $R^{f2}$ or $R^{f3}$ include the divalent fluorine-containing aliphatic ring structure exemplified in the above formula.

When sufficient anti-slip properties are required for the surface layer, m1 and m2 are preferably integers of 0 to 30, more preferably integers of 0 to 20, and particularly preferably integers of 0 to 10. If m1 and m2 are less than or equal to the upper limit value in this range, the anti-slip properties of the surface layer are even better.

When sufficient abrasion resistance and fingerprint stain removability are required for the surface layer, m1 and m2 are preferably integers of 2 to 200, more preferably integers of 5 to 150, and particularly preferably integers of 10 to 100. If m1 and m2 are less than or equal to the lower limit value of this range, the abrasion resistance and fingerprint stain removability of the surface layer are even better. If m1 and m2 is less than or equal to the upper limit value in this range, the abrasion resistance of the surface layer is even better. That is, if the number average molecular weight of the compound 1A and compound 1B is too large, the number of hydrolyzable silyl groups present per unit molecular weight decreases, and the abrasion resistance of the surface layer deteriorates.

n1, n2, and n3 determine whether the end of the polyfluoropolyether chain bonded to $R^1$ is a carbon atom or an oxygen atom. Each of n1, n2, and n3 may be 0 or 1. Of these, from the viewpoint of ease of production and the like, it is preferable that the end of the polyfluoropolyether chain bonded to $R^1$ is a carbon atom. That is, n1 is preferably 0, n2 is preferably 1, and n3 is preferably 0.

Examples of straight chain or branched oxyfluoroalkylene units among $OR^{f2}$ include: OCHF, $OCF_2CHF$, $OCHFCF_2$, $OCF_2CH_2$, $OCH_2CF_2$, $OCF_2CF_2CHF$, $OCHFCF_2CF_2$, $OCF_2CF_2CH_2$, $OCH_2CF_2CF_2$, $OCF_2CF_2CF_2CH_2$, $OCH_2CF_2CF_2CF_2$, $OCF_2CF_2CF_2CF_2CH_2$, $OCH_2CF_2CF_2CF_2CF_2$, $OCF_2CF_2CF_2CF_2CF_2CH_2$, $OCH_2CF_2CF_2CF_2CF_2CF_2$, $OCF_2$, $OCF_2CF_2$, $OCF_2CF_2CF_2$, $OCF(CF_3)CF_2$, $OCF_2CF_2CF_2CF_2$, $OCF(CF_3)CF_2CF_2$, $OCF_2CF_2CF_2CF_2CF_2$, $OCF_2CF_2CF_2CF_2CF_2CF_2$.

Examples of $OR^{f2}$ include an oxyfluorocycloalkylene unit. In the formula, * represents a bond.

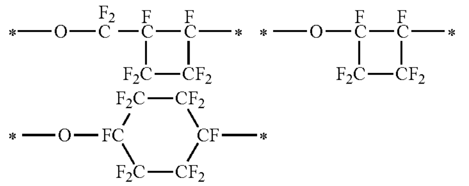

In $(OR^{f2})_{m1}$ and $(OR^{f2})_{m2}$, when two or more kinds of oxyfluoro(cyclo)alkylene unit are present, the bonding order of each oxyfluoro(cyclo)alkylene unit is not limited. For example, if $OCF_2$ and $OCF_2CF_2$ are present, $OCF_2$ and $OCF_2CF_2$ may be arranged randomly, alternately, or in blocks.

"two or more kinds of oxyfluoro(cyclo)alkylene units are present" refers to cases where two or more kinds of oxyfluoro(cyclo)alkylene units having different numbers of carbon atoms are present, cases where two or more kinds of oxyfluoro(cyclo)alkylene units having different numbers of hydrogen atoms are present, cases where two or more kinds of oxyfluoro(cyclo)alkylene units in which the positions of the hydrogen atoms are different are present, and cases where two or more kinds of oxyfluoro(cyclo)alkylene units are present in which, despite the number of carbon atoms being the same, the presence/absence of side chains and kinds of side chains (number of side chains, number of carbon atoms on side chains, etc.) are different.

Regarding the arrangement of the two or more kinds of oxyfluoro(cyclo)alkylene units, for example, a structure represented by $\{(OCF_2)_{m3}(OCF_2CF_2)_{m4}\}$ indicates that m3 $(OCF_2)$ and m4 $(OCF_2CF_2)$ are randomly arranged. Further, a structure represented by $(OCF_2CF_2—OCF_2CF_2CF_2CF_2)_{m5}$ indicates that m5 $(OCF_2CF_2)$ and m5 $(OCF_2CF_2CF_2CF_2)$ are alternately arranged.

The $(OR^{f2})_{m1}$ or $(OR^{f2})_{m2}$ when a cycloalkylene unit is not included preferably have the following structures in at least a part thereof.

$\{(OCF_2)_{m6}(OCF_2CF_2)_{m7}\}$,
$(OCF_2CF_2)_{m8}$,
$(OCF_2CF_2CF_2)_{m9}$,
$(OCF_2CF_2—OCF_2CF_2CF_2CF_2)_{m10}$,
$(OCF_2CF_2CF_2CF_2CF_2)_{m11}(OCF_2)_{m12}$,
$(OCF_2CF_2CF_2CF_2CF_2)_{m11}(OCF_2CF_2)_{m12}$,
$(OCF_2CF_2CF_2CF_2CF_2CF_2)_{m11}(OCF_2)_{m12}$,
$(OCF_2CF_2CF_2CF_2CF_2CF_2)_{m11}(OCF_2CF_2)_{m12}$,
$(OCF_2CF_2CF_2CF_2CF_2—OCF_2)_{m13}$,
$(OCF_2CF_2CF_2CF_2CF_2—OCF_2CF_2)_{m13}$,
$(OCF_2CF_2CF_2CF_2CF_2CF_2—OCF_2)_{m13}$,
$(OCF_2CF_2CF_2CF_2CF_2CF_2—OCF_2CF_2)_{m13}$,
$(OCF_2—OCF_2CF_2CF_2CF_2CF_2)_{m13}$,
$(OCF_2—OCF_2CF_2CF_2CF_2CF_2CF_2)_{m13}$,
$(OCF_2CF_2—OCF_2CF_2CF_2CF_2CF_2)_{m13}$,
$(OCF_2CF_2—OCF_2CF_2CF_2CF_2CF_2CF_2)_{m13}$, and
$(OCF(CF_3)CF_2)_{m14}$.

In the formulas, m6, m7, m8, m9, m10, m11, m12, m13, and m14 are integers of one or more. The upper limit values of m6, m7, m8, m9, m10, m11, m12, m13, and m14 are adjusted to match the upper limit values of m1 and m2.

From the viewpoint of ease of production of compound 1A and compound 1B, $(OR^{f2})_{m1}$ or $(OR^{f2})_{m2}$ when the cycloalkylene unit is not included is preferably the following.

$\{(OCF_2)_{m6}(OCF_2CF_2)_{m7}\}OCF_2$,
$(OCF_2CF_2)_{m8}OCF_2$,
$(OCF_2CF_2CF_2)_{m9}OCF_2CF_2$,
$(OCF_2CF_2)_2\{(OCF_2)_{m6}(OCF_2CF_2)_{m7}\}OCF_2$,
$(OCF_2CF_2—OCF_2CF_2CF_2CF_2)_{m10}OCF_2CF_2OCF_2CF_2CF_2$,
$(OCF_2—OCF_2CF_2CF_2CF_2CF_2)_{m13}OCF_2OCF_2CF_2CF_2CF_2$,
$(OCF_2—OCF_2CF_2CF_2CF_2CF_2CF_2)_{m13}OCF_2OCF_2CF_2CF_2CF_2CF_2$,
$(OCF_2CF_2—OCF_2CF_2CF_2CF_2CF_2)_{m13}OCF_2CF_2OCF_2CF_2CF_2CF_2$,
$(OCF_2CF_2—OCF_2CF_2CF_2CF_2CF_2CF_2)_{m13}OCF_2CF_2OCF_2CF_2CF_2CF_2CF_2$,
$(OCF(CF_3)CF_2)_{m14}OCF(CF_3)$.

The $(OR^{f2})_{m1}$ or $(OR^{f2})_{m2}$ when a cycloalkylene unit is included preferably have the following structures in at least a part thereof.

$(OCF_2CF_2—OCF_2CF_2CF_2CF_2)_{m15}—O(c\text{-}C_4F_6)—(OCF_2CF_2CF_2CF_2—OCF_2CF_2)_{m16}$,
$(OCF_2CF_2CF_2CF_2—O(c\text{-}C_4F_6))_{m17}$,
$(OCF_2CF_2—OCF_2CF_2CF_2CF_2CF_2CF_2)_{m18}—O(c\text{-}C_4F_6)—(OCF_2CF_2CF_2CF_2CF_2CF_2—OCF_2CF_2)_{m19}$.

In these formulas, $c\text{-}C_4F_6$ is a perfluoro 1,2-cyclobutylene group, and m15, m16, m17, m18, and m19 are integers of one or more. The upper limit values of m15, m16, m17, m18, and m19 are adjusted to the upper limit values of m1 and m2.

From the viewpoint of ease of production of compound 1A and compound 1B, $(OR^{f2})_{m1}$ or $(OR^{f2})_{m2}$ when the cycloalkylene unit is included is preferably the following.

$OCF_2CF_2CF_2(OCF_2CF_2—OCF_2CF_2CF_2CF_2)_{m15}—O(c\text{-}C_4F_6)—(OCF_2CF_2CF_2CF_2—OCF_2CF_2)_{m16}OCF_2CF_2CF_2$ $OCF_2CF_2(OCF_2CF_2CF_2CF_2—O(c\text{-}C_4F_6))_{m17}OCF_2CF_2CF_2$, $O(c\text{-}C_4F_6)(OCF_2CF_2CF_2CF_2—O(c\text{-}C_4F_6))_{m17}OCF_2CF_2CF_2$, and $OCF_2CF_2CF_2(OCF_2CF_2—OCF_2CF_2CF_2CF_2CF_2CF_2)_{m15}—O(c\text{-}C_4F_6)—(OCF_2CF_2CF_2CF_2CF_2CF_2—OCF_2CF_2)_{m16}OCF_2CF_2CF_2$.

$Q^1$ is a straight chain or branched (g+1)-valent organic group, and constitutes a linking group as —O—C(═O)-$Q^1$.

When (g+1) is 3 or more, $Q^1$ preferably has at least one branch point (hereinafter, referred to as "branch point P") selected from the group consisting of C, N, Si, a ring structure, and a (g+1)-valent organopolysiloxane residue.

The ring structure is, from the viewpoint of ease of production of compound 1A and 1B, and the viewpoint that the abrasion resistance, light resistance, and chemical resistance of the surface layer are even better, preferably at least one selected from the group consisting of a 3- to 8-member alicyclic ring, a 3- to 8-member ring aromatic ring, a 3- to 8-member heterocyclic ring, and a condensed ring consisting of two or more of these rings, and particularly preferably the ring structure shown in the following formula. The ring structure optionally has a substituent, such as a halogen atom, an alkyl group (optionally including an etheric oxygen atom between carbon-carbon atoms), a cycloalkyl group, an alkenyl group, an allyl group, an alkoxy group, an oxo group (═O), and the like.

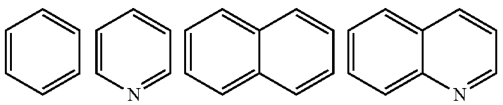

-continued

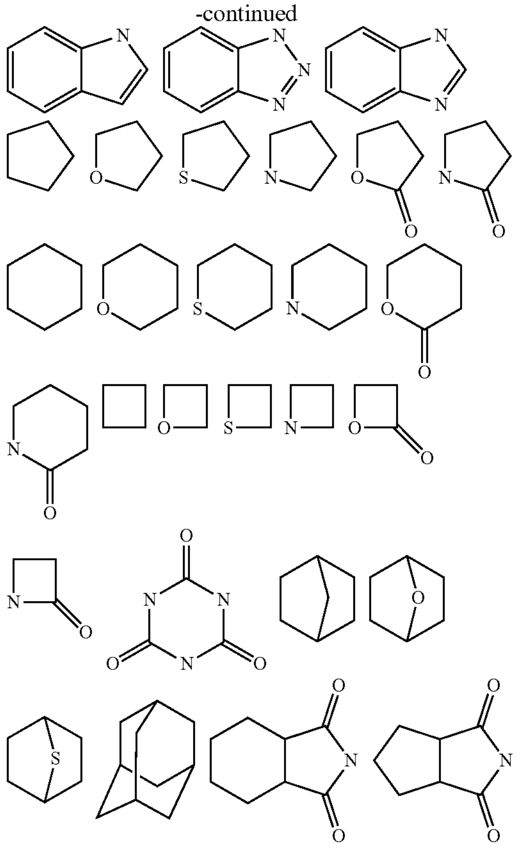

Examples of the (g+1)-valent organopolysiloxane residue include the following groups. In the following formula, $R^5$ is a hydrogen atom, an alkyl group, an alkoxy group, or a phenyl group. The number of carbon atoms of the alkyl group and the alkoxy group of $R^5$ is preferably 1 to 10, and 1 is particularly preferable.

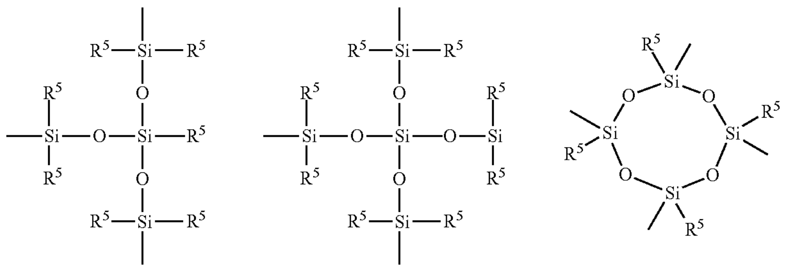

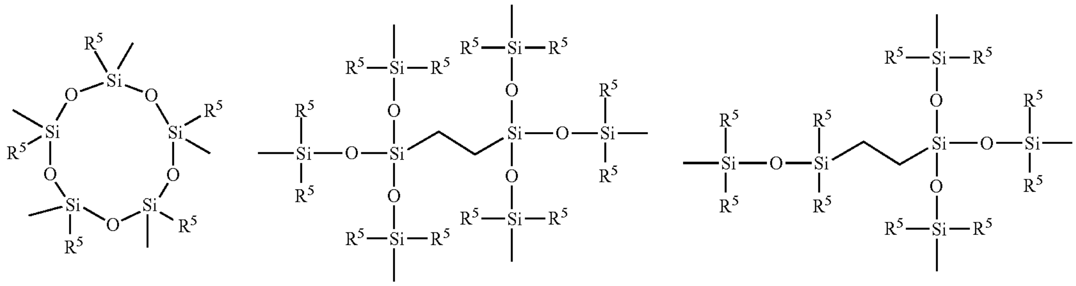

-continued

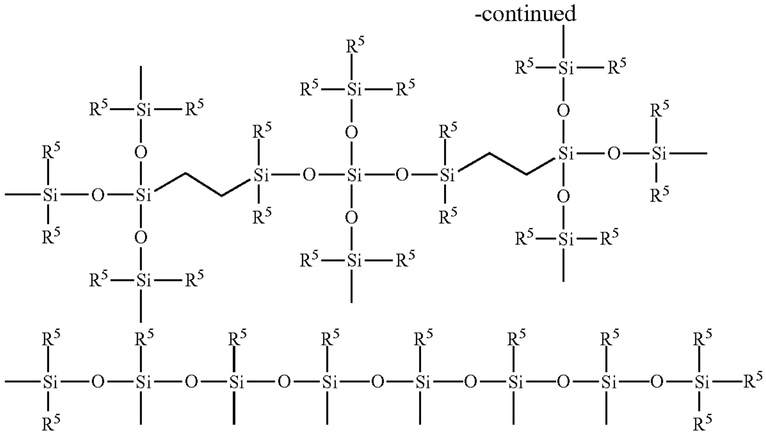

$Q^1$ optionally further has at least one bond (hereinafter, referred to as "bond B") selected from the group consisting of —C(O)$NR^6$—, —C(O)O—, —C(O)—, —O—, —$NR^6$—, —S—, —OC(O)O—, —NHC(O)O—, —NHC(O)$NR^6$—, —$SO_2NR^6$—, —$Si(R^6)_2$—, —$OSi(R^6)_2$—, —$Si(CH_3)_2$-Ph-$Si(CH_3)_2$—, and a divalent organopolysiloxane residue. Here, $R^6$ is a hydrogen atom, an alkyl group having 1 to 6 carbon atoms, or a phenyl group, and Ph is a phenylene group. The number of carbon atoms of the alkyl group of $R^6$ is, from the viewpoint of ease of production of compound 1A or compound 1B, preferably 1 to 3, and particularly preferably 1 to 2.

Examples of the divalent organopolysiloxane residue include groups having the following formula. In the formula, $R^7$ is a hydrogen atom, an alkyl group, an alkoxy group, or a phenyl group. The number of carbon atoms of the alkyl group and the alkoxy group of $R^7$ is preferably 1 to 10, and 1 is particularly preferable.

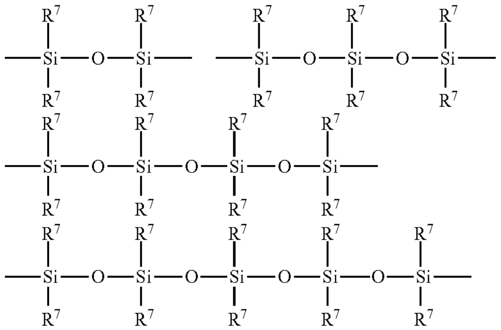

The bond B is, from the viewpoint of ease of production of compound 1A or compound 1B, preferably at least one bond selected from the group consisting of —C(O)$NR^6$—, —C(O)—, —$NR^6$—, and —O—, and from the viewpoint that the light resistance and chemical resistance of the surface layer are even better, —C(O)$NR^6$— or —C(O)— is particularly preferable.

Examples of $Q^1$ include a combination of two or more divalent hydrocarbon groups and one or more branch points P, or a combination of two or more hydrocarbon groups, one or more branch points P, and one or more bonds B.

Examples of the divalent hydrocarbon group include a divalent aliphatic hydrocarbon group (alkylene group, cycloalkylene group, etc.), and a divalent aromatic hydrocarbon group (phenylene group, etc.). The number of carbon atoms of the divalent hydrocarbon group is preferably 1 to 10, more preferably 1 to 6, and particularly preferably 1 to 4.

$Q^1$ is, from the viewpoint of ease producing compound 1, preferably a group represented by any of the following formulas (Q1) to (Q7).

Formula (Q1)

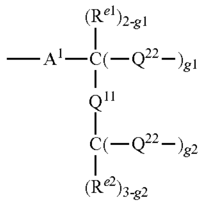

$-A^1-C(R^{e2})_{3-g3}(-Q^{22}-)_{g3}$ Formula (Q2)

$-A^2-N(-Q^{23}-)_2$ Formula (Q3)

$-A^3-Z^1(-Q^{24}-)_{g4}$ Formula (Q4)

$-A^2-Si(R^{e3})_{3-g3}(-Q^{25}-)_{g3}$ Formula (Q5)

$-A^1-Q^{26}-$ Formula (Q6)

$-A^1-CH(-Q^{22}-)-Si(R^{e3})_{3-g5}(-Q^{25}-)_{g5}$ Formula (Q7)

In formulas (Q1) to (Q7), the $A^1$, $A^2$, or $A^3$ side is linked to —O—C(═O)— in formula 1, and the $Q^{22}$, $Q^{23}$, $Q^{24}$, $Q^{25}$, or $Q^{26}$ side is linked to T, $A^1$ is a single bond, an alkylene group, or a group having —C(O)$NR^{e6}$—, —C(O)—, —$NR^{e6}$, or —O— between carbon-carbon atoms of an alkylene group having two or more carbon atoms, $A^2$ is an alkylene group or a group having —C(O)$NR^{e6}$—, —C(O)—, —$NR^{e6}$—, or —O— between carbon-carbon atoms of an alkylene group having two or more carbon atoms, $A^3$ is $A^1$ when the atom in $Z^1$ to which $A^3$ is bonded is a carbon atom, and is $A^2$ when the atom in $Z^1$ to which $A^3$ is bonded is a nitrogen atom, $Q^{11}$ is a single bond, —O—, an alkylene group, a group having —C(O)$NR^{e6}$—, —C(O)—, —$NR^{e6}$, or —O— between carbon-carbon atoms of an alkylene group having two or more carbon atoms, $Q^{22}$ is an alkylene group, a group having —C(O)N$R^{e6}$—, —C(O)—, —N$R^{e6}$—, or —O— between carbon-carbon atoms of an alkylene group having two or more carbon atoms, a group having —C(O)N$R^{e6}$—, —C(O)—, —N$R^{e6}$—, or —O— at an end on the side not linked to the T of the alkylene group, or a group having —C(O)N$R^{e6}$—, —C(O)—, —N$R^{e6}$—, or —O— between carbon-carbon atoms of an alkylene group having two or more carbon atoms and having —C(O)N$R^{e6}$, —C(O)—, —N$R^{e6}$—, or —O— at an end on the side not linked to the T of the alkylene group, and when $Q^1$ has two or more $Q^{22}$, the two or more $Q^{22}$ may be the same or different, $Q^{23}$ is an alkylene group or a group having —C(O)N$R^{e6}$—, —C(O)—, —N$R^{e6}$—, or —O— between carbon-carbon atoms of an alkylene group having two or more carbon atoms, and the two $Q^{23}$ may be the same or different, $Q^{24}$ is $Q^{22}$ when the atom in $Z^1$ to which $Q^{24}$ is bonded is a carbon atom, is $Q^{23}$ when the atom in $Z^1$ to which $Q^{24}$ is bonded is a nitrogen atom, and when $Q^1$ has two or more $Q^{24}$, the two or more $Q^{24}$ may be the same or different, $Q^{25}$ is an alkylene group or a group having —C(O)N$R^{e6}$—, —C(O)—, —N$R^{e6}$—, or —O— between carbon-carbon atoms of an alkylene group having two or more carbon atoms, and when $Q^1$ has two or more $Q^{25}$, the two or more $Q^{25}$ may be the same or different, $Q^{26}$ is an alkylene group or a group having —C(O)N$R^{e6}$—, —C(O)—, —N$R^{e6}$—, or —O— between carbon-carbon atoms of an alkylene group having two or more carbon atoms, $Z^1$ is a (g4+1)-valent group having a ring structure having a carbon atom or nitrogen atom to which $A^3$ is directly bonded and a carbon atom or nitrogen atom to which $Q^{24}$ is directly bonded, $R^{e1}$ is a hydrogen atom or an alkyl group, and when $Q^1$ has two or more $R^{e1}$, the two or more $R^{e1}$ may be the same or different, $R^{e2}$ is a hydrogen atom, a hydroxyl group, an alkyl group, or an acyloxy group, $R^{e3}$ is an alkyl group, $R^{e6}$ is a hydrogen atom, an alkyl group having 1 to 6 carbon atoms, or a phenyl group, g1 is an integer from 0 to 3, g2 is an integer from 0 to 3, and g1+g2 is an integer from 1 to 6, g3 is an integer from 1 to 3, g4 is an integer greater than or equal to one, and g5 is an integer from 0 to 3.

It is noted that g1+g2=g, g3=g, g4=g, and g5+1=g.

The number of carbon atoms of the alkylene group of $Q^{11}$, $Q^{22}$, $Q^{23}$, $Q^{24}$, $Q^5$, or $Q^{26}$ is, from the viewpoint of ease of production of compound 1A or compound 1B, and the viewpoint that the abrasion resistance, light resistance, and chemical resistance of the surface layer are even better preferably 1 to 10, more preferably and 1 to 6, and particularly preferably 1 to 4. It is noted that the lower limit value of the number of carbon atoms of the alkylene group when having a specific bond between the carbon-carbon atoms is 2.

Examples of the ring structure in Z include the ring structures described above, and the same is true in the preferred embodiment. Since $Q^{24}$ is directly bonded to the ring structure in Z, situations in which an alkylene group, for example, is linked to the ring structure and $Q^{24}$ is linked to the alkylene group do not occur.

The number of carbon atoms of the alkyl group of $R^{e1}$, $R^{e2}$, or $R^{e3}$ is, from the viewpoint of ease of production of compound 1A or compound 1B, preferably 1 to 6, more preferably 1 to 3, and particularly preferably 1 to 2.

The number of carbon atoms of the alkyl group moiety of the acyloxy group of $R^{e2}$ is, from the viewpoint of ease of production of compound 1, preferably 1 to 6, more preferably 1 to 3, and particularly preferably 1 to 2.

g4 is, from the viewpoint of ease of production of compound 1A or compound 1B, and from the viewpoint that the abrasion resistance and fingerprint stain removability of the surface layer are even better, preferably 2 to 6, more preferably 2 to 4, and particularly preferably 2 or 3.

Examples of other embodiments of $Q^1$ include the groups represented by any of the following formulas (Q11) to (Q17).

Formula (Q11)

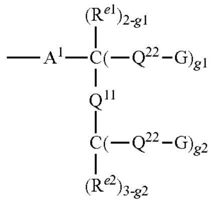

$$-A^1-C(R^{e2})_{3-g3}(-Q^{22}-G)_{g3} \quad \text{Formula (Q12)}$$

$$-A^2-N(-Q^{23}-G)_2 \quad \text{Formula (Q13)}$$

$$-A^3-Z^1(-Q^{24}-G)_{g4} \quad \text{Formula (Q14)}$$

$$-A^2-Si(R^{e3})_{3-g3}(-Q^{25}-G)_{g3} \quad \text{Formula (Q15)}$$

$$-A^1-Q^{26}-G \quad \text{Formula (Q16)}$$

$$-A^1-CH(-Q^{22}-)—Si(R^{e3})_{3-g5}(-Q^{25}-G)_{g5} \quad \text{Formula (Q17)}$$

In formulas (Q11) to (Q17), the $A^1$, $A^2$, or $A^3$ side is linked to —O—C(=O)— in formula 1, and the $Q^{22}$, $Q^{23}$, $Q^{24}$, $Q^{25}$, or $Q^{26}$ side is linked to T. G is a group g3 having the following formula, and the two or more G that $Q^1$ has may be the same or different. The symbols other than G are the same as the symbols in formulas (Q1) to (Q7).

$$—Si(R^8)_{3-k}(-Q^3-)_k \quad \text{Formula g3}$$

In formula g3, the Si side is linked to $Q^{22}$, $Q^{23}$, $Q^{24}$, $Q^{25}$, or $Q^{26}$, and the $Q^3$ side is linked to T. $R^8$ is an alkyl group. $Q^3$ is an alkylene group, a group having —C(O)N$R^6$—, —C(O)—, —N$R^6$—, or —O— between carbon-carbon atoms of an alkylene group having two or more carbon atoms or —$(OSi(R^9)_2)_p$—O—, and two or more $Q^3$ may be the same or different. k is 2 or 3. $R^6$ is a hydrogen atom, an alkyl group having 1 to 6 carbon atoms, or a phenyl group. $R^9$ is an alkyl group, a phenyl group, or an alkoxy group, and the two $R^9$ may be the same or different. p is an integer of 0 to 5, and when p is 2 or more, the two or more $(OSi(R^9)_2)$ may be the same or different.

The number of carbon atoms of the alkylene group of $Q^3$ is, from the viewpoint of ease of production of compound 1A or compound 1B, and the viewpoint that the abrasion resistance, light resistance, and chemical resistance of the surface layer are even better preferably 1 to 10, more preferably and 1 to 6, and particularly preferably 1 to 4. It is noted that the lower limit value of the number of carbon atoms of the alkylene group when having a specific bond between the carbon-carbon atoms is 2.

The number of carbon atoms of the alkyl group of $R^8$ is, from the viewpoint of ease of production of compound 1A or compound 1B, preferably 1 to 6, more preferably 1 to 3, and particularly preferably 1 to 2.

The number of carbon atoms of the alkyl group of $R^9$ is, from the viewpoint of ease of production of compound 1A or compound 1B, preferably 1 to 6, more preferably 1 to 3, and particularly preferably 1 to 2.

The number of carbon atoms of the alkoxy group of $R^9$ is, from the viewpoint that the storage stability of compound 1A or compound 1B is excellent, preferably 1 to 6, more preferably 1 to 3, and particularly preferably 1 to 2.

p is preferably 0 or 1.

T is $—Si(R)_{3-a}(L)_a$, and is a reactive silyl group.

The number of carbon atoms of the alkyl group of R is, from the viewpoint of ease of production of compound 1A or compound 1B, preferably 1 to 6, more preferably 1 to 3, and particularly preferably 1 to 2.

L is a hydrolyzable group or hydroxyl group.

The hydrolyzable group of L is a group that turns into a hydroxyl group by a hydrolysis reaction. That is, the hydrolyzable silyl group represented by Si-L turns into a silanol group represented by Si—OH by a hydrolysis reaction. The silanol groups further undergo a dehydration condensation reaction between the silanol groups to form Si—O—Si bonds. In addition, the silanol groups can undergo a dehydration condensation reaction with hydroxyl groups on the surface of the substrate (substrate-OH) to form a chemical bond (substrate-O—Si).

Specific examples of L include an alkoxy group, an aryloxy group, a halogen atom, an acyl group, an acyloxy group, and an isocyanate group (—NCO). The alkoxy group is preferably an alkoxy group having 1 to 4 carbon atoms. The aryloxy group is preferably an aryloxy group having 3 to 10 carbon atoms. The halogen atom is preferably a chlorine atom. The acyl group is preferably an acyl group having 1 to 6 carbon atoms. The acyloxy group is preferably an acyloxy group having 1 to 6 carbon atoms. L is preferably an alkoxy group having 1 to 4 carbon atoms or a halogen atom.

From the viewpoint of stronger adhesion between the surface layer and the substrate, a is particularly preferably 3.

A plurality of T in compound 1A or compound 1B may be the same or different. From the viewpoint of ease of production of compound 1A or compound 1B, T are preferably the same group.

g denotes the number of reactive silyl groups. From the viewpoint of ease of production of compound 1 and the viewpoint that the abrasion resistance and fingerprint stain removability of the surface layer are even better, g is preferably 1 to 6, more preferably 1 to 5, further preferably 1 to 4, and particularly preferably 2 to 4.

Specific examples of the present compound include compounds having the formulas listed below. The following compounds are industrially easy to produce, easy to handle, have better water and oil repellency, abrasion resistance, fingerprint stain removability, lubricity, chemical resistance, and light resistance of the surface layer, and of those chemical resistance is particularly better. $R^f$ in the following compounds is the same as $R^f$ in formula 1 described above, and the preferred embodiment is also the same. Further, m21 to m39 and n21 to n39 in the following compounds represent repeating units, and mx+nx (x is 21 to 39) is 1 to 500.

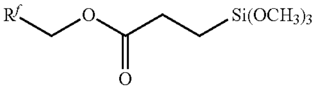
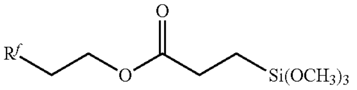
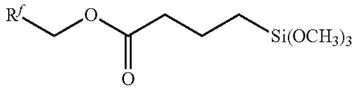
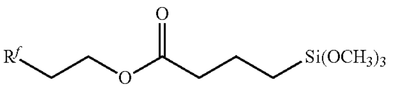
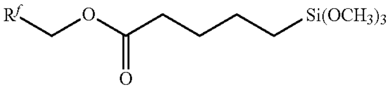
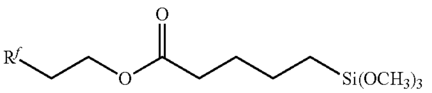
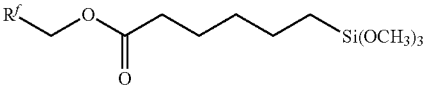
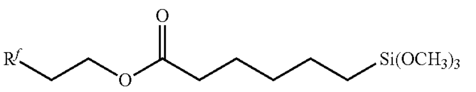
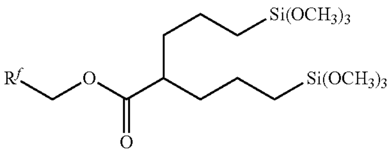
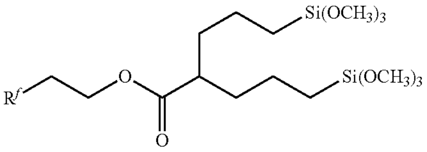
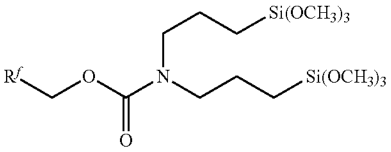
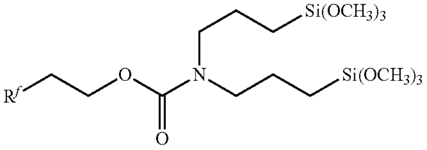
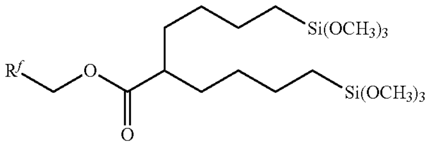

-continued
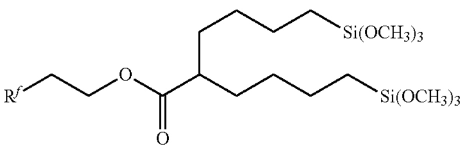
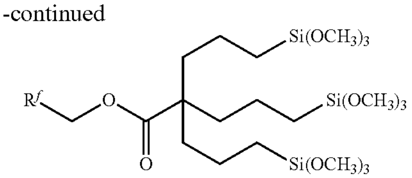
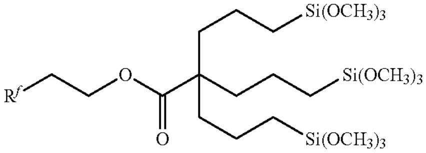
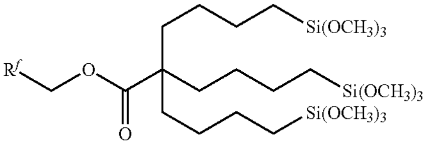
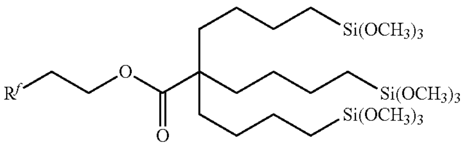
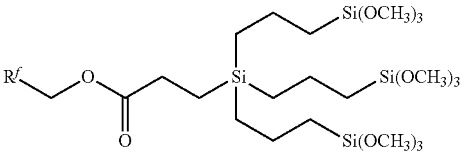
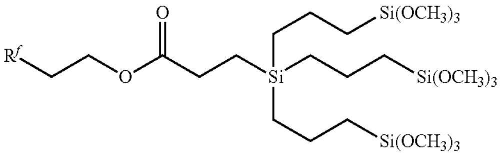
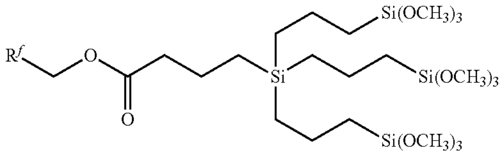
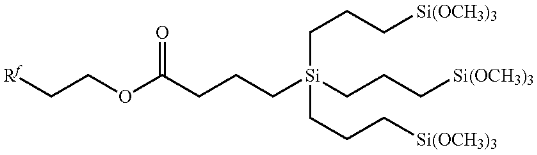
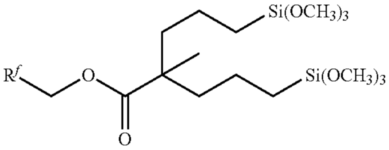
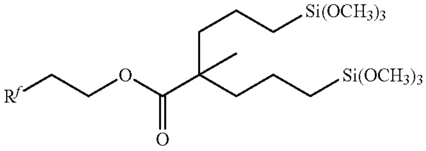
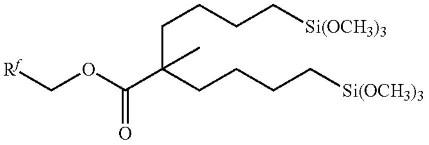
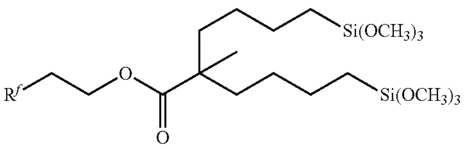
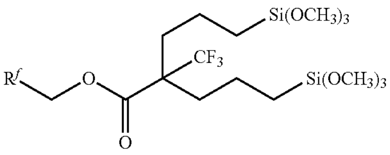
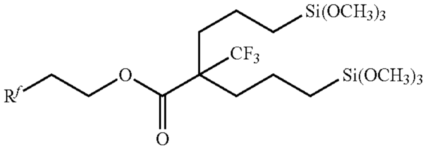
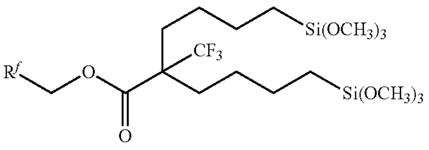
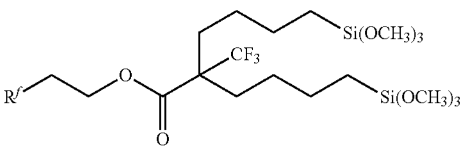
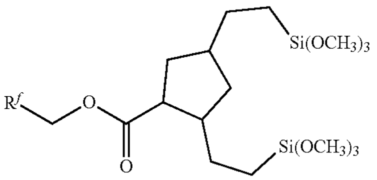
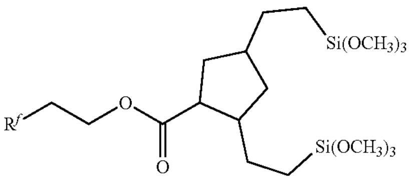
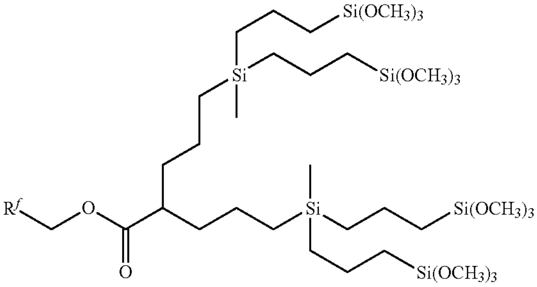

-continued
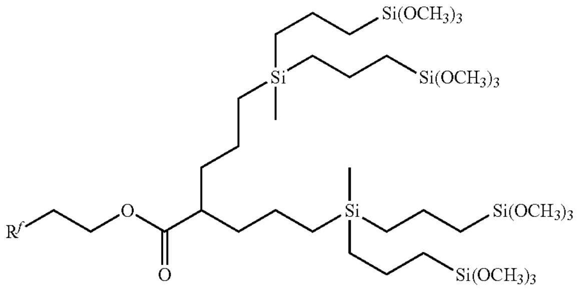
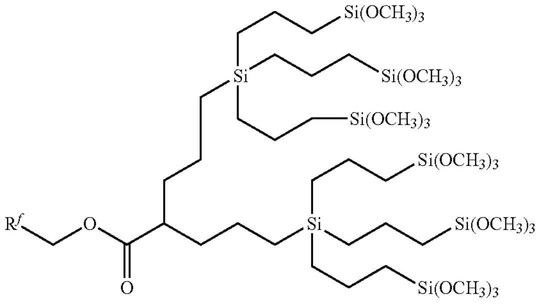
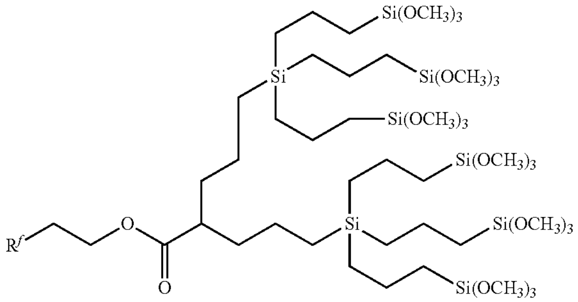
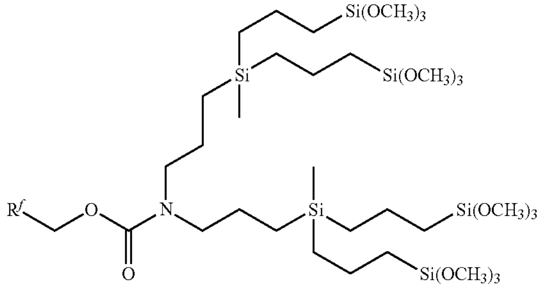
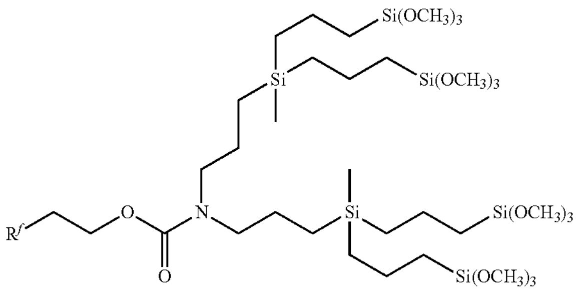
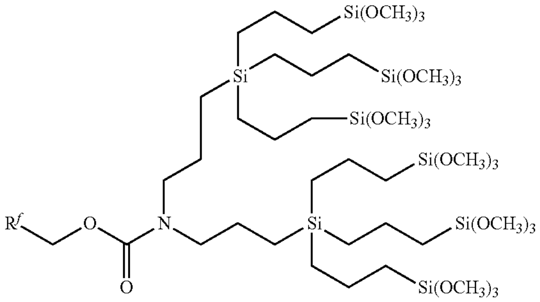
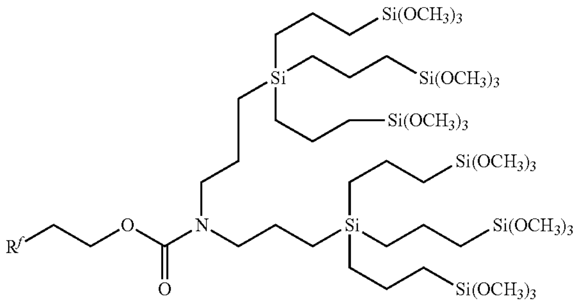
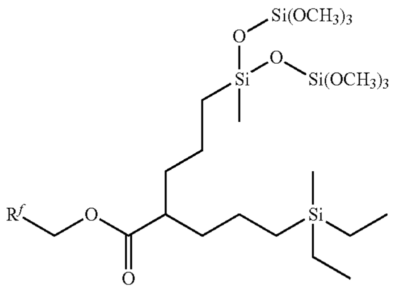
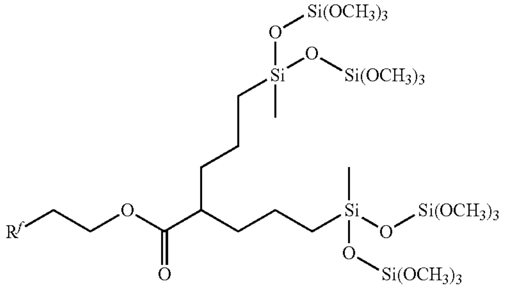
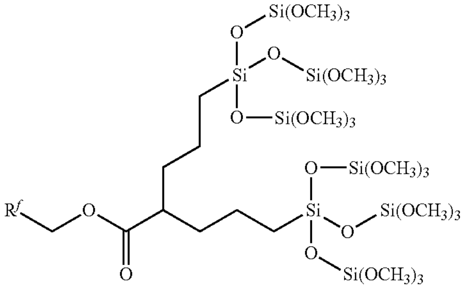

-continued
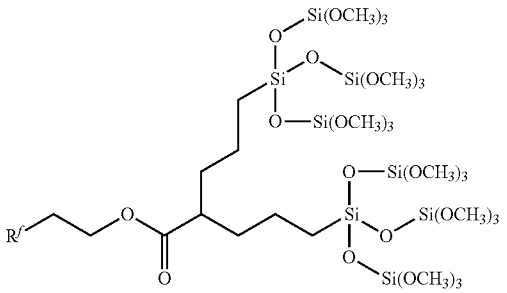
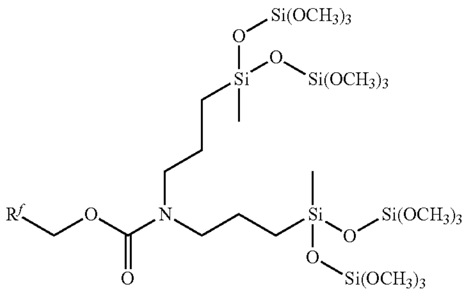
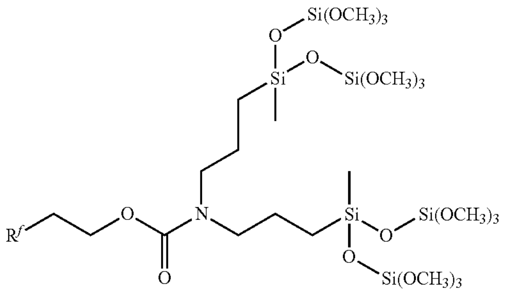
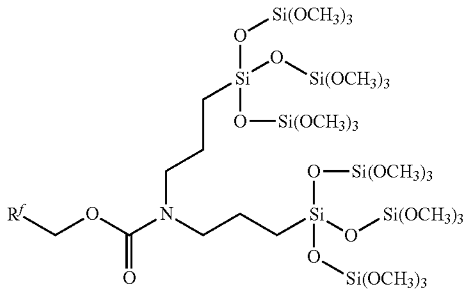
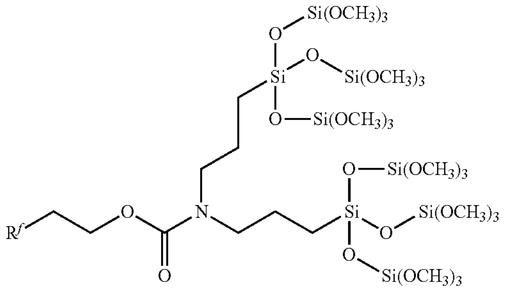
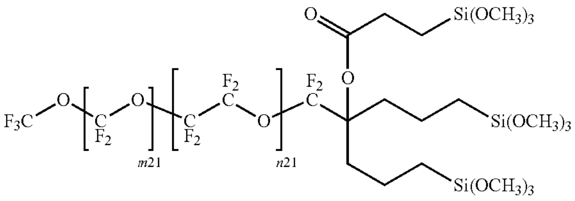
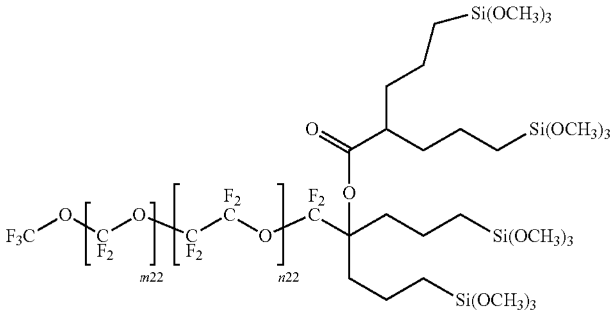
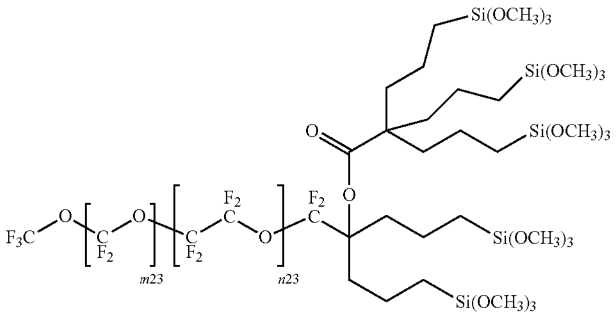
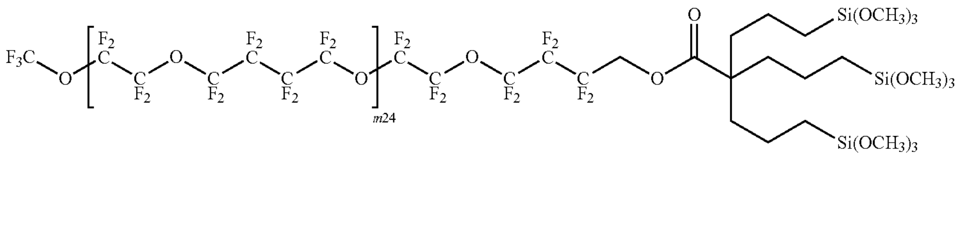

-continued
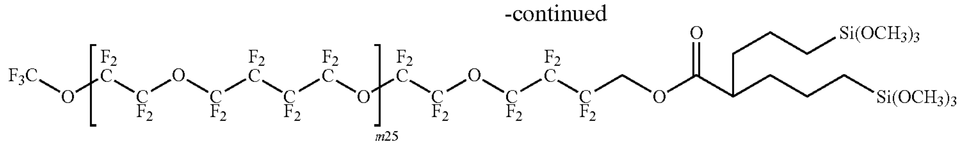
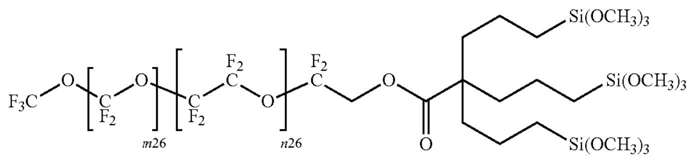
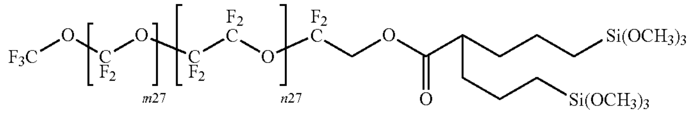
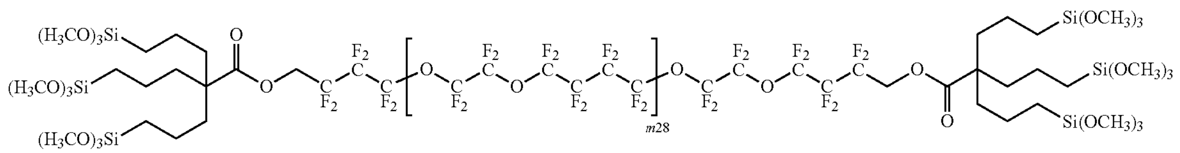
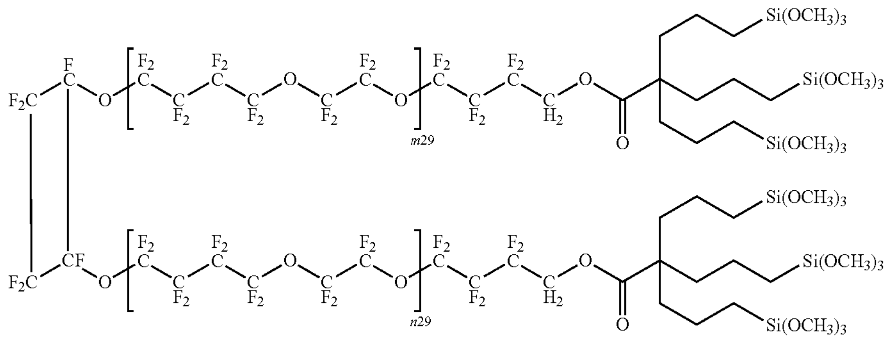
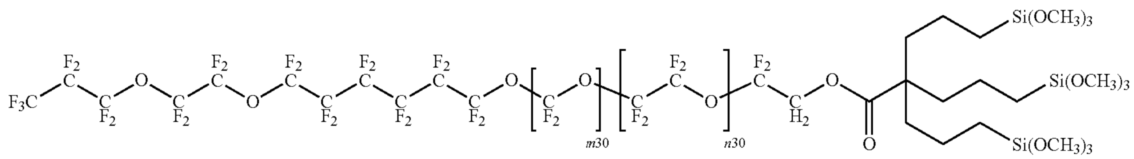
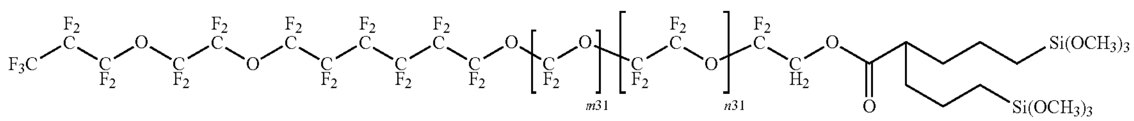
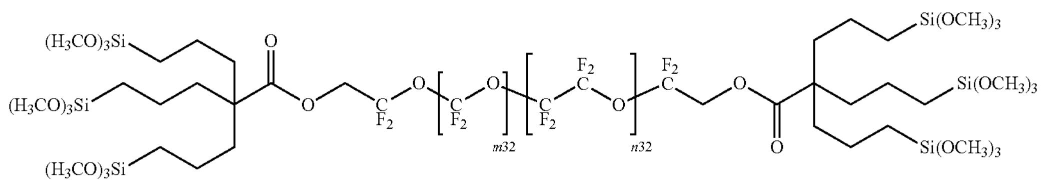
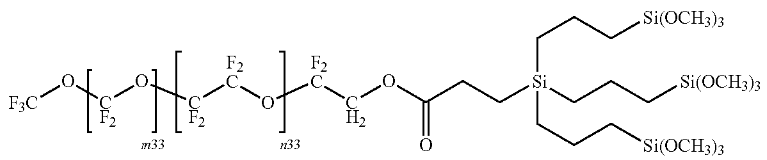

-continued
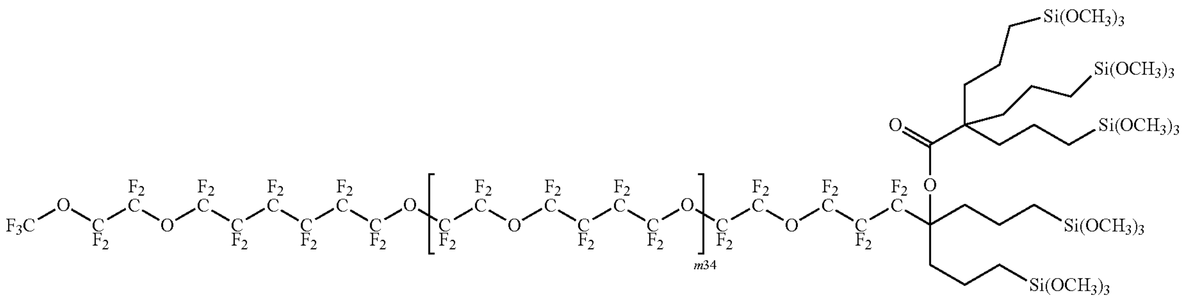
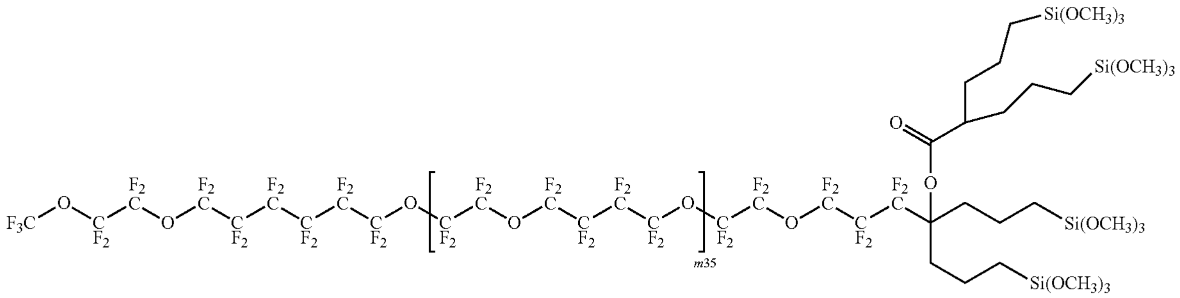
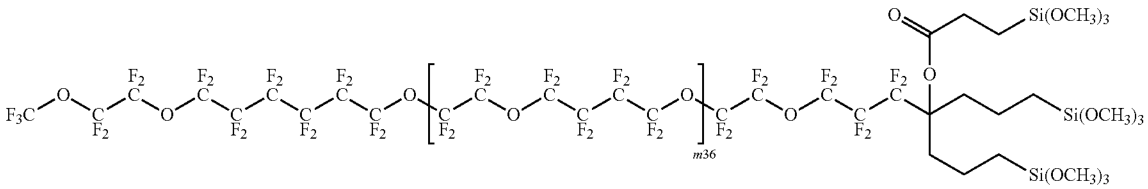
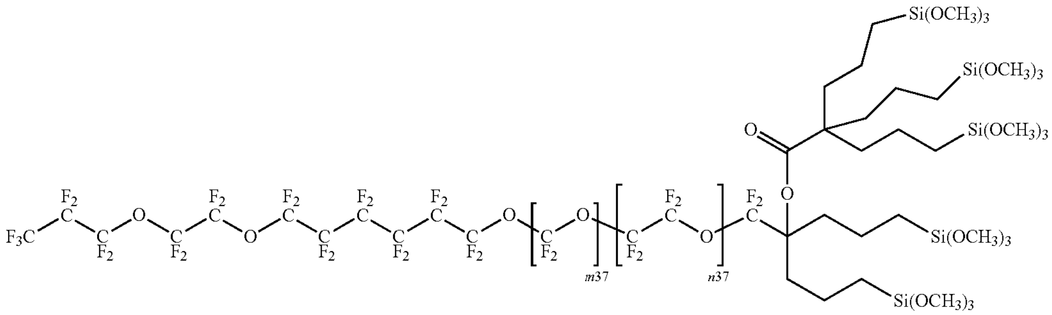
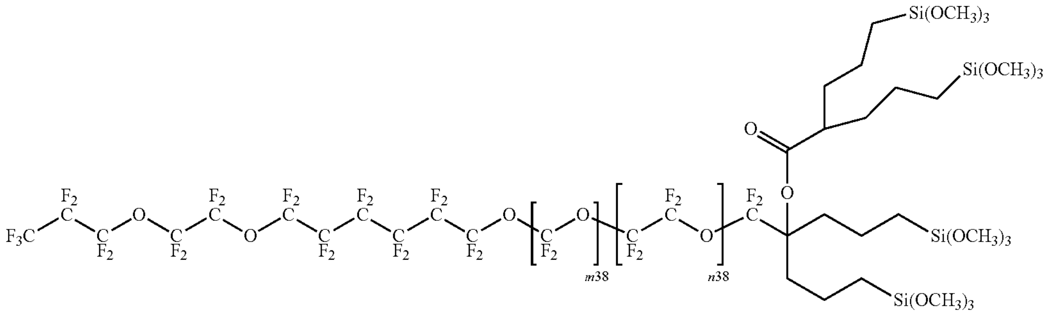
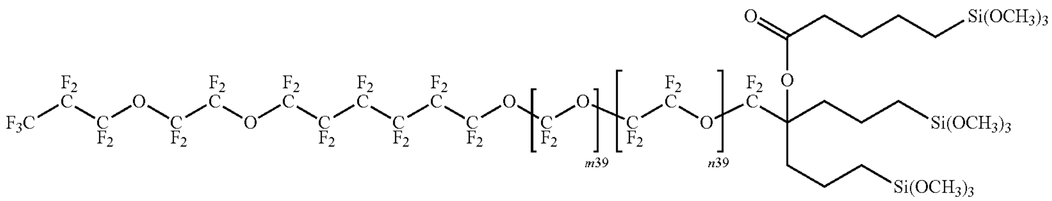

(Method for Producing Present Compound)

A method for producing the present compound will now be described by way of an example. The production method is not limited to the following method, but according to the following method, present compound can be obtained at a high yield.

The compound that is present compound can be produced, for example, by a method in which the following compound 2 and the following compound 3a or compound 3b are subjected to a hydrosilylation reaction.

$R^f[-R^1-O-C(=O)-Q^{10}\{-CH=CH_2\}_g]_j$ Formula 2

In formula 2, $Q^{10}$ is a (g+1)-valent organic group, and the symbols other than $Q^{10}$ are the same as the symbols in formula 1.

$Q^{10}\{-CH=CH_2\}_g$ becomes $Q^1$ in compound 1 after the hydrosilylation. Examples of $Q^{10}$ include the same groups as described for $Q^1$, and the preferred embodiment is also the same.

$HSi(R)_{3-a}(L)_a$ Formula 3a $HSi(R^8)_{3-k}[-(OSi(R^9)_2)_p-O-Si(R)_{3-a}(L)_a]_k$ Formula 3b In the formulas, the symbols in formulas 3a and 3b are the same as the symbols in formulas 1A, 1B, and g3. Compound 3b can be produced, for example, by the method described in the specification of Japanese Unexamined Patent Application Publication No. 2018-085493.

Compound 2 can be produced, for example, by a method of reacting the following compound 4a and the following compound 4b.

$R^f[-R^1-OH]_j$ Formula 4a $X-C(=O)-Q^{10}\{-CH=CH_2\}_g$ Formula 4b

In the formulas, among the symbols in formulas 4a and 4b, X is a halogen atom, and the symbols other than X are the same as the symbols in formulas 1 and 2.

Examples of X include a fluorine atom, a chlorine atom, a bromine atom, and the like, and a chlorine atom is preferable. Compound 4a and compound 4b may be synthesized or a commercially available product may be used.

[Fluorine-Containing-Compound-Containing Composition]

The fluorine-containing-compound-containing composition of the present invention (hereinafter, referred to as "present composition") is a composition including the above-described fluorine-containing compound, which is the present compound, and at least any of a fluorine-containing compound other than the present compound and the following impurities. Examples of the impurities include compounds that are unavoidable in the production of the present compound and the additional fluorine-containing compound. The present composition does not include a liquid medium described later.

Examples of the additional fluorine-containing compound include fluorine-containing compounds produced as a by-product in the production process of the present compound (hereinafter, referred to as "by-product fluorine-containing compounds"), known fluorine-containing compounds used in similar applications as the present compound, and the like.

As the additional fluorine-containing compound, a compound that is less likely to cause a deterioration in the properties of the present compound is preferable.

From the viewpoint of sufficiently exhibiting the characteristics of the present compound, the content of the additional fluorine-containing compound is, of the total amount of the present composition, preferably less than 50% by mass, more preferably less than 30% by mass, and further preferably less than 10% by mass.

Examples of by-product fluorine-containing compounds include unreacted fluorine-containing compounds at the time of synthesis of the present compound. If the present composition includes by-product-containing fluorine compounds, a purification step for removing the by-product-containing fluorine compounds or reducing the amount of such by-product-containing fluorine compounds can be omitted.

Examples of known fluorine-containing compounds include those described in the following literature.

The perfluoropolyether-modified aminosilanes described in Japanese Unexamined Patent Application Publication No. H11-029585,

- the silicon-containing organic fluorine-containing polymers described in Japanese Patent No. 2874715,
- the organic silicon compounds described in Japanese Unexamined Patent Application Publication No. 2000-144097,
- the perfluoropolyether-modified aminosilanes described in Japanese Unexamined Patent Application Publication No. 2000-327772,
- the fluorinated siloxanes described in Published Japanese Translation of PCT International Publication for Patent Application, No. 2002-506887,
- the organic silicone compounds described in Published Japanese Translation of PCT International Publication for Patent Application, No. 2008-534696,
- the fluorinated modified hydrogen-containing polymers described in Japanese Patent No. 4138936,
- the compounds described in United States Patent Publication No. 2010/0129672, International Patent Publication No. WO 2014/126064, and Japanese Unexamined Patent Application Publication No. 2014-070163,
- the organosilicon compounds described in International Patent Publication No. WO 2011/060047 and International Patent Publication No. 2011/059430,
- the fluorine-containing organosilane compounds described in International Patent Publication No. WO 2012/064649,
- the fluorooxyalkylene group-containing polymers described in Japanese Unexamined Patent Application Publication No. 2012-72272,
- the fluorine-containing ether compounds described in International Patent Publication No. WO 2013/042732, International Patent Publication No. WO 2013/121984, International Patent Publication No. WO 2013/121985, International Patent Publication No. WO 2013/121986, International Patent Publication No. WO 2014/163004, Japanese Unexamined Patent Application Publication No. 2014-080473, International Patent Publication No. WO 2015/087902, International Patent Publication No. WO 2017/038830, International Patent Publication No. WO 2017/038832, and International Patent Publication No. WO 2017/187775,
- the perfluoro(poly)ether-containing silane compounds described in Japanese Unexamined Patent Application Publication No. 2014-218639, International Patent Publication No. WO 2017/022437, International Patent Publication No. WO 2018/079743, and International Patent Publication No. WO 2018/143433,
- the fluoropolyether group-containing-polymer-modified silanes described in Japanese Unexamined Patent Application Publication No. 2015-199906, Japanese Unexamined Patent Application Publication No. 2016-204656, Japanese Unexamined Patent Application Publication No. 2016-210854, and Japanese Unexamined Patent Application Publication No. 2016-222859, and the fluorine-containing ether compounds described in International Patent Publication No. WO 2018/216630, International Patent Publication No. WO 2019/039226, International Patent Publication No. WO 2019/039341, International Patent Publication No. WO 2019/039186, International Patent Publication No. WO 2019/044479, Japanese Unexamined Patent Application Publication No. 2019-44158, and International Patent Publication No. WO 2019/163282.

Further, commercially available fluorine-containing compounds include the KY-100 series (KY-178, KY-185, KY-195, and the like) manufactured by Shin-Etsu Chemical Co., Ltd., A fluid (register trademark) S550 manufactured by AGC Inc., Optool (register trademark) DSX, Optool (register trademark) AES, Optool (register trademark) UF503, Optool (register trademark) UD509 manufactured by Daikin Industries Ltd., and the like.

The proportion of the present compound in the composition is less than 100% by mass, preferably 60% by mass or more, more preferably 70% by mass or more, and further preferably 80% by mass or more.

If the composition includes an additional fluorine-containing compound, the proportion of the additional fluorine-containing compound based on the total amount of the present compound and the additional fluorine-containing compound in the composition is preferably 40% by mass or less, more preferably 30% by mass or less, and further preferably 20% by mass or less.

The proportion of the total amount of the present compound and the additional fluorine-containing compound in the composition is preferably 80% by mass or more, and more preferably 85% by mass or more.

If the content of the present compound and the additional fluorine-containing compound is within the above range, the surface layer has excellent water and oil repellency, abrasion resistance, fingerprint stain removability, lubricity, and appearance.

[Coating Liquid]

The coating liquid of the present invention (hereinafter, also referred to as the "present coating liquid") includes the present compound or present composition and a liquid medium. The coating liquid may be a liquid, may be a solution, or may be a dispersion.

It is sufficient for the present coating liquid to include the present compound or the present composition, and may contain impurities such as by-products produced in the production process of present compound.

The concentration of the present compound or the present composition is preferably 0.001 to 40% by mass of the coating liquid, preferably 0.01 to 20% by mass, and more preferably 0.1 to 10% by mass.

The liquid medium is preferably an organic solvent. The organic solvent may be a fluorine-based organic solvent, may be a non-fluorine-based organic solvent, or may include both solvents.

Examples of the fluorine-based organic solvent include fluorinated alkanes, fluorinated aromatic compounds, fluoroalkylkyl ethers, fluorinated alkylamines, fluoroalcohols, and the like.

As the fluorinated alkane, a compound having 4 to 8 carbon atoms is preferable. Examples of commercially available products include $C_6F_{13}H$ (manufactured by AGC Inc., Asahiklin (register trademark) AC-2000), $C_6F_{13}C_2H_5$ (manufactured by AGC Inc., Asahiklin (register trademark) AC-6000), $C_2F_5CHFCHFCF_3$ (manufactured by Chemours, Vertrel (register trademark) XF), and the like.

Examples of the fluorinated aromatic compound include hexafruolobenzene, trifluoromethylbenzene, perfluorotolene, bis(trifluoromethyl)benzene, and the like.

As the fluoroalkyl ether, a compound having 4 to 12 carbon atom is preferable. Examples of commercially available products include $CF_3CH_2OCF_2CF_2H$ (manufactured by AGC Inc., Asahiklin (register trademark) AE-3000), $C_4F_9OCH_3$ (manufactured by 3M, Novec (register trademark) 7100), $C_4F_9OC_2H_5$ (manufactured by 3M, Novec (register trademark) 7200), $C_2F_5CF(OCH_3)C_3F_7$ (manufactured by 3M, Novec (register trademark) 7300), and the like.

Examples of the fluorinated alkylamine include perfluorotripropylamine, perfluorotributylamine, and the like.

Examples of the fluoroalcohol include 2,2,3,3-tetrafluoropropanol, 2,2,2-trifluoroethanol, hexafuruoloisopropanol, and the like.

As the non-fluorine-based organic solvent, compounds consisting only of hydrogen atoms and carbon atoms and compounds consisting only of hydrogen atoms, carbon atoms, and oxygen atoms are preferable. Examples include hydrocarbon-based organic solvents, alcohol-based organic solvents, ketone-based organic solvents, ether-based organic solvents, and ester-based organic solvents.

The present coating liquid preferably includes 75 to 99.999% by mass of the liquid medium, more preferably 85 to 99.99% by mass of the liquid medium, and particularly preferably 90 to 99.9% by mass % of the liquid medium.

The present coating liquid may include other components in addition to the present compound or the present composition and the liquid medium, to the extent that the effects of the present invention are not impaired.

Examples of the other components include known additives such as acid catalysts and basic catalysts that promote the hydrolysis and condensation reactions of the hydrolyzable silyl group.

The content of other components in the present coating liquid is preferably 10% by mass or less, and 1% by mass or less is more preferable.

The concentration of the present compound and other components in total or the present composition and other components in total in the present coating liquid (hereinafter, also referred to as the "solid content concentration") is preferably 0.001 to 40% by mass, preferably 0.01 to 20% by mass, more preferably 0.01 to 10% by mass, and more preferably 0.01 to 1% by mass. The solid content concentration of the coating liquid is a value calculated from the mass of coating liquid before heating and the mass after heating at 120° C. for 4 hours in a convection dryer.

[Article]

FIG. 1 is a schematic cross-sectional view showing an example of the article of the present invention. A first article of the present invention is an article 20 having, in order, a substrate 12, a base layer 14, and a surface layer 22.

The base layer contains an oxide including silicon, and the surface layer contains a condensate of the present compound.

The material and shape of the substrate in the first article may be appropriately selected according to the application or the like of the article. Examples of the material of the substrate include glass, resin, sapphire, metal, ceramic, stone, and composite materials of these. The glass may be chemically strengthened. In particular, examples of substrate requiring water and oil repellency include a substrate for a touch panel, a substrate for a display, a substrate constituting a housing for an electronic device, and the like. The substrate for a touch panel and the substrate for a display are transmissive to light. As used herein, “transmissive to light” means having a vertically-incident visible light transmittance in accordance with JIS R3106:1998 (ISO 9050: 1990) of 25% or more. The material of the substrate for a touch panel is preferably glass or a transparent resin.

The substrate may be subjected to a surface treatment such as a corona discharge treatment, a plasma treatment, a plasma graft polymerization treatment, and the like on the surface that the base layer is provided on. The surface subjected to the surface treatment has even better adhesion between the substrate and the base layer, and as a result the wear resistance of the surface layer improves even more. The surface treatment is, from the viewpoint that the wear resistance of the surface layer is even better, preferably a corona discharge treatment or a plasma treatment.

The base layer is a layer containing at least an oxide including silicon, and may further have other elements. When the base layer contains silicon oxide, a partial structure (2) of the present compound undergoes dehydration condensation, and a Si—O—Si bond is formed with the base layer to form a surface layer having excellent wear durability.

The content of silicon oxide in the base layer may be 65% by mass or more, preferably 80% by mass or more, more preferably 85% by mass or more, and further preferably 90% by mass or more. If the content of silicon oxide is greater than or equal to the lower limit value of this range, Si—O—Si bonds are sufficiently formed in the base layer, and the mechanical properties of the base layer are sufficiently secured. The content of silicon oxide is the balance of the mass of the base layer excluding the total content of other elements (or, in the case of oxides, the amount converted into oxides).

From the viewpoint of the durability of the surface layer, the oxide in the base layer further preferably contains one or more elements selected from alkaline metal elements, alkaline earth metal elements, platinum group elements, boron, aluminum, phosphorus, titanium, zirconium, iron, nickel, chromium, molybdenum, and tungsten. By containing these elements, the bonds between the base layer and the present compound become stronger and wear resistance is improved.

When the base layer includes one or more selected from iron, nickel, and chromium, the total content thereof is preferably 10 to 1100 mass ppm with respect to silicon oxide, more preferably 50 to 1100 mass ppm, further preferably 50 to 500 mass ppm, and particularly preferably 50 to 250 mass ppm.

When the base layer includes one or more selected from aluminum and zirconium, the total content thereof is preferably 10 to 2500 mass ppm, more preferably 15 to 2000 mass ppm, and further preferably 20 to 1000 mass ppm.

When the base layer contains an alkaline metal element, the total content thereof is preferably 0.05% to 15% by mass, more preferably 0.1 to 13% by mass, and further preferably 1.0 to 10% by mass. Examples of the alkaline metal element include lithium, sodium, potassium, rubidium, and cesium.

When the base layer contains a platinum group element, the total content thereof is preferably 0.02 mass ppm or more and 800 mass ppm or less, more preferably 0.04 mass ppm or more and 600 mass ppm or less, and further preferably 0.7 mass ppm or more and 200 mass ppm or less. Examples of the platinum group elements include platinum, rhodium, ruthenium, palladium, osmium, and iridium.

When the base layer includes one or more selected from boron and phosphorus, the total content thereof is, from the viewpoint of the wear resistance of the surface layer, as the ratio of the total molar concentration of boron and phosphorus to the molar concentration of silicon, preferably 0.003 to 9, more preferably 0.003 to 2, and further preferably 0.003 to 0.5.

When the base layer contains an alkaline earth metal element, the total content thereof is, from the viewpoint of the wear resistance of the surface layer, as the ratio of the total molar concentration of alkaline earth metal element to the molar concentration of silicon, preferably 0.005 to 5 by mass, more preferably 0.005 to 2, and further preferably 0.007 to 2. Examples of the alkaline earth metal element include lithium, sodium, potassium, rubidium, and cesium.

From the viewpoint of improving the adhesion of the present compound and improving the water and oil repellency and wear resistance of the article, the base layer is preferably a silicon oxide layer including an alkaline metal atom. Of these, in the silicon oxide layer, in the region of a depth from the surface in contact with the surface layer of 0.1 to 0.3 nm, the average concentration of alkaline metal atoms is preferably $2.0\times10^{19}$ atoms/$cm^3$ or more. On the other hand, from the viewpoint of sufficiently securing the mechanical properties of the silicon oxide layer, the average concentration of the alkaline metal atom is preferably $4.0\times10^{22}$ atoms/$cm^3$ or less.

The thickness of the base layer is preferably 1 to 200 nm, and particularly preferably 2 to 20 nm. If the thickness of the base layer is greater than or equal to the lower limit value of this range, the effect of an improvement in adhesion by the base layer is easy to sufficiently obtain. If the thickness of the base layer is less than or equal to the upper limit value in this range, the wear resistance of the base layer itself increases. Examples of the method for measuring the thickness of the base layer include a method by cross-sectional observation of the base layer by an electron microscope (SEM, TEM, etc.), and a method using an optical interference film thickness gauge, a spectroscopic ellipsometer, a step meter, and the like.

Examples of the method for forming the base layer include a method of vapor-depositing a vapor deposition material having a desired base layer composition on the substrate surface.

One example of the vapor deposition method is vacuum deposition. Vacuum deposition is a method in which the vapor deposition material is volatilized in a vacuum chamber and adhered onto the surface of the substrate.

The temperature at the time of vapor deposition (for example, when using a vacuum deposition apparatus, the temperature of the boat where the vapor deposition material is placed) is preferably 100 to 3000° C., and particularly preferably 500 to 3000° C.

The pressure at the time of vapor deposition (for example, when using a vacuum deposition apparatus, the absolute pressure in the tank where the deposition material is placed) is preferably 1 Pa or less, and particularly preferably 0.1 Pa or less.

When using a vapor deposition material to form the base layer, one vapor deposition material may be used or two or more vapor deposition materials including different elements may be used.

Examples of the method for vaporing the vapor deposition material include a resistance heating method in which the vapor deposition material is melted and vaporing on a resistance heating boat made from a high melting point metal, and an electron gun method in which an electron beam is irradiated on the vapor deposition material to directly heat the vapor deposition material and melt the surface then vapor the vapor deposition material. As the method for vaporing the vapor deposition material, an electron gun method is preferable because the heating can be carried out locally, so that even materials having a high melting point can be vapored, and also because locations not irradiated by the electron beam have a low temperature, so that there is no concern of a reaction with the vessel or of contamination of impurities. The vapor deposition material used in the electron gun method is preferably a molten granular body or a sintered body from the viewpoint that such materials are less likely to scatter even if air flow occurs.

The surface layer on the base layer contains a condensate of the present compound. Examples of condensates of the present compound include products in which a silanol group (Si—OH) is formed by hydrolyzation of the hydrolyzable silyl group in the present compound, and a Si—O—Si bond is formed by dehydration condensation between the silanol groups, and products in which the silanol group in the present compound undergoes a condensation reaction with a silanol group or a Si-OM group (M is an alkaline metal element) on the surface of the base layer to form a Si—O—Si bond. Further, the surface layer may also include a condensate of a fluorine-containing compound other than the present compound. That is, the surface layer includes a fluorine-containing compound having a reactive silyl group in a state in which a part or all of the reactive silyl group of the fluorine-containing compound has been condensed.

The thickness of the surface layer is preferably 1 to 100 nm, and particularly preferably 1 to 50 nm. If the thickness of the surface layer is greater than or equal to the lower limit value of this range, the effect by the surface layer can be sufficiently obtained. If the thickness of the surface layer is less than or equal to the upper limit value of this range, utilization efficiency is high.

The thickness of the surface layer is the thickness obtained by an X-ray diffraction meter for thin film analysis. The thickness of the surface layer can be calculated from the oscillation period of the interference pattern by obtaining an interference pattern of reflected X-rays by an X-ray reflectance method using an X-ray diffraction meter for thin film analysis.

A second article of the present invention is an article 20 having, in order, the substrate 12 and the surface layer 22.

The substrate contains an oxide including silicon.

The surface layer contains a condensate of the present compound.

In the second article, the substrate has the composition of the base layer in the first article, and therefore the wear durability of the surface layer is excellent even if the surface layer is formed directly on the substrate.

The material of substrate in the second article may have the composition of the above-described base layer, and may be a glass substrate or the like, for example. Since the details of the material of the substrate are the same as the material of the base layer, a description thereof is omitted here. Further, since the composition of the surface layer is the same as in the first article, a description thereof is omitted here.

[Method for Producing Article]

The method for producing the article according to the present invention is a method in which a surface layer is formed by a dry coating method or a wet coating method using the above-described fluorine-containing compound, the above-described fluorine-containing-compound-containing composition, or the above-described coating liquid.

The present compound and the present composition can be used as is in a dry coating method. The present compound and the present composition are suitable for forming a surface layer having excellent adhesion by a dry coating method. Examples of the dry coating method include methods such as vacuum vapor deposition, CVD, and sputtering. From the viewpoint of suppressing decomposition of the present compound and the simplicity of the apparatus, a vacuum deposition method can be suitably used.

In the vacuum deposition, a pellet-like substance in which the present compound is supported on a metal porous body composed of a metal material such as iron or steel may be used. The pellet-like substance supporting the present compound can be produced by impregnating a metal porous body with a solution of the present compound and drying to remove the liquid medium. As the solution of present compound, the present coating liquid can be used.

The present coating liquid can be suitable used in a wet coating method. Examples of the wet coating method include spin coating, wipe coating, spray coating, squeegee coating, dip coating, die coating, an inkjet method, flow coating, roll coating, casting, a Langmuir-Blodgett method, gravure coating, and the like.

In order to improve the abrasion resistance of the surface layer, an operation may be performed as necessary to promote the reaction between the present compound and the substrate. Examples of the operation include heating, humidification, light irradiation, and the like. For example, the substrate on which the surface layer is formed may be heated in an atmosphere having moisture to promote reactions, such as a hydrolysis reaction of hydrolyzable groups, a reaction between hydroxyl groups and the like on the surface of the substrate and silanol groups, and generation of siloxane bonds by a condensation reaction of silanol groups.

After the surface treatment, compounds in the surface layer that are not chemically bonded to another compound or the substrate may be removed as necessary. Specific methods include, for example, a method of pouring a solvent on the surface layer, a method of wiping off with a cloth soaked with a solvent, and the like.

EXAMPLES

The present invention will now be described in more detail by using the following examples, but the present invention is not limited to these examples. In the following, "%" refers to "% by mass" unless otherwise noted. Examples 1 to 18 and Examples 20 to 21 are working examples, and Example 19 is a comparative example. Hereinafter, $C_6F_{13}H$ is designated as AC2000, $CF_3CF_2CF_2CF_2CF_2CH_2CH_2CH_3$ is designated as AC6000, $ClCF_2CFClCF_2OCF_2CF_2Cl$ is designated as CFE-419, and $CF_3CF_2CHCl_2$ is designated as AK-225.

Example 1

Example 1-1

Compound (A-1) was obtained according to the method described in Example 2-3 of the examples of International Patent Publication No. WO 2013/121984.

$$CF_3(OCF_2CF_2OCF_2CF_2CF_2CF_2)_{x1}OCF_2CF_2OCF_2CF_2CF_2{-}C({=}O)OCH_3 \qquad \text{Formula (A-1)}$$

In the formula, the average value of x1 is 13.

Example 1-2

2.4 g of sodium borohydride powder was placed in a 300 cc three-necked round bottom flask, and 15 g of AC2000 was added thereto. The mixture was stirred while cooling in an ice bath, and a solution obtained by mixing 30 g of compound (A-1), 4 g of methanol, and 60 g of AC2000 was slowly added dropwise under a nitrogen atmosphere from a dropping funnel so that the internal temperature did not exceed 10° C. After the total amount had been added dropwise, 4 g of methanol was further added dropwise. Then, the mixture was stirred at 10° C. The mixture was again cooled in an ice bath, and an aqueous solution of hydrochloric acid was added dropwise. After the reaction finished, the mixture was successively washed with a hydrochloric acid solution and water, and the organic phase was collected. The collected organic phase was concentrated and distilled under reduced pressure to obtain 29 g of compound (A-2).

$CF_3(OCF_2CF_2OCF_2CF_2CF_2CF_2)_{m1}OCF_2CF_2OCF_2CF_2CF_2—CH_2—OH$ Formula (A-2)

Example 1-3

0.67 g of $HO(C{=}O)C(CH_2CH{=}CH_2)_3$, 33 mL of dichloromethane, and 0.67 mL of oxalyl chloride were charged into a 200 cc eggplant flask. The resulting mixture was stirred under ice cooling, and then 0.0393 g of DMF (N,N-dimethylformamide) was added. After that, the mixture was stirred at room temperature, and then concentrated to obtain 0.6 g of $Cl(C{=}O)C(CH_2CHCH_2)_3$.

7 g of compound (A-2), 7 g of AC6000, 0.4 g of triethylamine, and 0.2 g of N,N-dimethyl-4-aminopyridine were charged into a separate 50 cc eggplant flask, 0.6 g of the above $Cl(C{=}O)C(CH_2CH{=}CH_2)_3$ was added, and the mixture was stirred at 30° C. The resulting reaction solution was purified by silica gel chromatography to obtain 5.8 g of compound (A-3).

$CF_3O(CF_2CF_2OCF_2CF_2CF_2CF_2O)_{x1}CF_2CF_2OCF_2CF_2CF_2—CH_2O(C{=}O)C(CH_2CH{=}CH_2)_3$ Formula (A-3)

Example 1-4

1.0 g of compound (A-3), 0.003 g of a solution of a platinum/1,3-divinyl-1,1,3,3-tetramethyldisiloxane complex in xylene (platinum content: 3% by mass), 0.0009 g of aniline, and 1.0 g of AC6000 were charged into a 50 cc eggplant flask that had been purged with nitrogen, then 0.11 g of trimethoxysilane was added, and the mixture was stirred at 40° C. for 4 hours. After further adding 0.003 g of the solution of the platinum/1,3-divinyl-1,1,3,3-tetramethyldisiloxane complex in xylene (platinum content: 3% by mass), aniline, and AC6000 and stirring, the solvent was removed by distillation to obtain 1.1 g (yield 95%) of compound (1-A).

$CF_3O(CF_2CF_2OCF_2CF_2CF_2CF_2O)_{x1}CF_2CF_2OCF_2CF_2CF_2—CH_2O(C{=}O)C[CH_2CH_2CH_2Si(OCH_3)_3]_3$ Formula (1-A)

Example 2

Example 2-1

The following compound (1-B) was obtained by the same method as in Example 1, except that the $HO(C{=}O)C(CH_2CH{=}CH_2)_3$ in Example 1-3 was changed to $HO(C{=}O)CH(CH_2CH{=}CH_2)_2$.

$CF_3(OCF_2CF_2OCF_2CF_2CF_2CF_2)_{x2}OCF_2CF_2OCF_2CF_2CF_2—CH_2O(C{=}O)CH[CH_2CH_2CH_2Si(OCH_3)_3]_2$ Formula (1-B)

In the formula, the average value of x2 is 13.

Example 3

Example 3-1

Compound (C-1) was obtained according to the method described in Example 1-1 to Example 1-4 of the examples of International Patent Publication No. WO 2017/038830.

$CF_3CF_2CF_2(OCF_2CF_2)(OCF_2CF_2)[(OCF_2)_{x3}(OCF_2CF_2)_{y3}]OCF_2C({=}O)OCH_3$ Formula (C-1)

In the formula, the average value of x3 is 21 and the average value of y3 is 20.

Example 3-2

The following compound (1-C) was obtained by the same method as in Example 1, except that compound (A-1) in Example 1-2 was changed to compound (C-1).

$CF_3CF_2CF_2(OCF_2CF_2)(OCF_2CF_2)[(OCF_2)_{x3}(OCF_2CF_2)_{y3}]OCF_2CH_2O(C{=}O)C[CH_2CH_2CH_2Si(OCH_3)_3]_3$ Formula (1-C)

In the formula, the average value of x3 is 21 and the average value of y3 is 20.

Example 4

Example 4-1

The following compound (1-D) was obtained by the same method as in Example 3, except that the $HO(C{=}O)C(CH_2CH{=}CH_2)_3$ in Example 1-3 referred to in Example 3 was changed to $HO(C{=}O)CH(CH_2CH{=}CH_2)_2$.

$CF_3CF_2CF_2(OCF_2CF_2)(OCF_2CF_2)[(OCF_2)_{x4}(OCF_2CF_2)_{y4}]OCF_2CH_2O(C{=}O)CH[CH_2CH_2CH_2Si(OCH_3)_3]_2$ Formula (1-D)

In the formula, the average value of x4 is 21 and the average value of y4 is 20.

Example 5

Example 5-1

Compound (E-1) was obtained according to the method described in Example 1-1 of the examples of International Patent Publication No. WO 2013/121984.

$CF_2{=}CF—O—CF_2CF_2CF_2CH_2—OH$ Formula (E-1)

Example 5-2

16.2 g of $HO—CH_2CF_2CF_2CH_2—OH$ and 13.8 g of potassium carbonate were placed in a 200 mL eggplant flask, the mixture was stirred at 120° C., 278 g of compound (E-1) was added, and the mixture was stirred at 120° C. The temperature was returned to 25° C., 50 g of each of AC2000 and hydrochloric acid were charged into the flask, the solution separated, and the organic phase was concentrated. The obtained crude reaction solution was purified by column chromatography to obtain 117.7 g (yield 40%) of compound (E-2).

Formula (E-2)

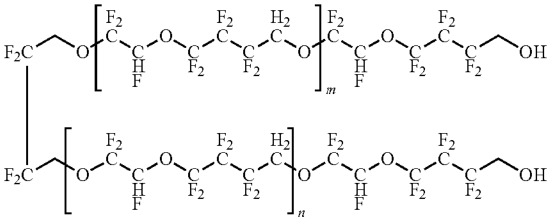

Example 5-3

20 g of compound (E-2), 2.4 g of sodium fluoride powder, 20 g of AC-2000, and 18.8 g of $CF_3CF_2CF_2OCF(CF_3)COF$ were charged into a 50 mL eggplant flask connected to a reflux cooler. The mixture was stirred at 50° C. under a nitrogen atmosphere. After cooling to room temperature, the sodium fluoride powder was removed with a pressurized filter, and then excess $CF_3CF_2CF_2OCF(CF_3)COF$ and AC-2000 were removed by distillation under reduced pressure to obtain 24 g (yield 100%) of compound (E-3).

Formula (E-3)

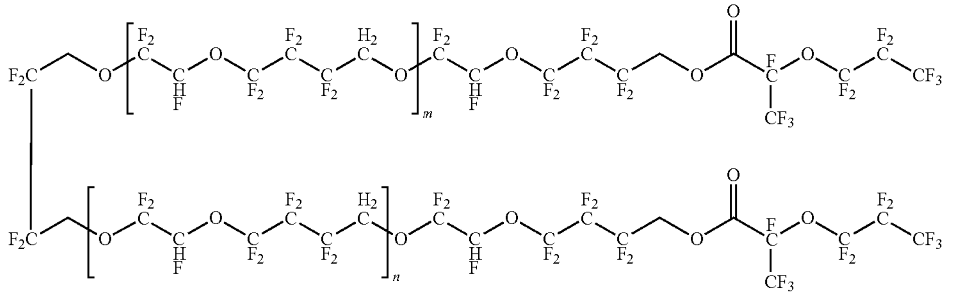

Example 5-4

250 mL of CFE-419 was placed in a 500 mL nickel reactor, and nitrogen gas was bubbled into the reactor. After the oxygen gas concentration was sufficiently lowered, 20% by volume fluorine gas diluted with nitrogen gas was bubbled for 1 hour. A CFE-419 solution of compound (E-3) (concentration: 10% by mass, compound (E-3): 24 g) was added. The ratio of the introduction rate of the fluorine gas (mol/hour) to the introduction rate of hydrogen atoms in compound (E-3) (mol/hour) was controlled to be 2:1. After the addition of compound (E-3) was complete, a CFE-419 solution in benzene (concentration: 0.1% by mass, benzene: 0.1 g) was added intermittently. After the addition of benzene was complete, fluorine gas was bubbled, and finally the inside of the reactor was thoroughly purged with nitrogen gas. The solvent was removed by distillation to obtain 25.3 g (yield 90%) of compound (E-4).

$CF_3CF_2CF_2$—$OCF(CF_3)$—C(=O)—O—$CF_2CF_2CF_2CF_2$—$(OCF_2CF_2$—$OCF_2CF_2CF_2CF_2)_{x5}$—$OCF_2CF_2$—$OCF_2CF_2CF_2CF_2$—O—C(=O)—$CF(CF_3)O$—$CF_2CF_2CF_3$ Formula (E-4)

Example 5-5

25.3 g of compound (E-4), 2.2 g of sodium fluoride, and 25 mL of AC-2000 were placed in a 50 mL eggplant flask and stirred in an ice bath. 1.7 g of methanol was added and the mixture was stirred at 25° C. The mixture was filtered, and the obtained filtrate was purified by column chromatography to obtain 15 g (yield 80%) of compound (E-5).

$CH_3$—O—C(=O)—$CF_2CF_2CF_2$—$(OCF_2CF_2$—$OCF_2CF_2CF_2CF_2)_{x5}$—$OCF_2CF_2$—$OCF_2CF_2CF_2$—C(=O)—O—$CH_3$ Formula (E-5)

In the formula, the average value of x5 is 13.

Example 5-6

1.6 g of sodium borohydride powder was placed in a 50 cc three-necked round bottom flask, and 5 g of AC2000 was added thereto. The mixture was stirred while cooling in an ice bath, and a solution obtained by mixing 10 g of compound (E-5), 1.3 g of methanol, and 20 g of AC2000 was slowly added dropwise under a nitrogen atmosphere from a dropping funnel so that the internal temperature did not exceed 10° C. After the total amount had been added dropwise, 1.3 g of methanol was further added dropwise. Then, the mixture was stirred at 10° C. The mixture was again cooled in an ice bath, and an aqueous solution of hydrochloric acid was added dropwise. After the reaction finished, the mixture was successively washed with a hydrochloric acid solution and water, and the organic phase was collected. The collected organic phase was concentrated and distilled under reduced pressure to obtain 9.7 g of compound (E-7).

$HOCH_2CF_2CF_2CF_2O$—$(CF_2CF_2O$—$CF_2CF_2CF_2CF_2O)_{x5}$—$CF_2CF_2O$—$CF_2CF_2CF_2CH_2OH$ Formula (E-7)

In the formula, the average value of x5 is 13.

Example 5-7

0.67 g of $HO(C{=}O)C(CH_2CH{=}CH_2)_3$, 33 mL of dichloromethane, and 0.67 mL of oxalyl chloride were charged into a 200 cc eggplant flask. The resulting mixture was stirred under ice cooling, and then 0.0393 g of DMF (N,N-dimethylformamide) was added. After that, the mixture was stirred at room temperature, and then concentrated to obtain 0.6 g of $Cl(C{=}O)C(CH_2CH\ CH_2)_3$. 3.5 g of compound (E-6), 3.5 g of AC6000, 0.4 g of triethylamine, and 0.2 g of N,N-dimethyl-4-aminopyridine were charged into a separate 50 cc eggplant flask, 0.6 g of the above $Cl(C{=}O)C(CH_2CH{=}CH_2)_3$ was added, and the mixture was stirred. The resulting reaction solution was purified by silica gel chromatography to obtain 2.9 g of the following compound (E-7).

$(CH_2{=}CHCH_2)_3C(C{=}O)OCH_2CF_2CF_2CF_2O—(CF_2CF_2O—CF_2CF_2CF_2CF_2O)_{x5}—CF_2CF_2O—CF_2CF_2CF_2CH_2O(C{=}O)C(CH_2CH{=}CH_2)_3$ Formula (E-7)

In the formula, the average value of x5 is 13.

Example 5-8

1.0 g of compound (E-7), 0.003 g of a solution of a platinum/1,3-divinyl-1,1,3,3-tetramethyldisiloxane complex in xylene (platinum content: 3% by mass), 0.001 g of aniline, and 1.0 g of AC6000 were charged into a 50 cc eggplant flask that had been purged with nitrogen, then 0.21 g of trimethoxysilane was added, and the mixture was stirred at 40° C. The solvent was then removed by distillation to obtain 1.2 g (yield 100%) of compound (1-E).

$[(CH_3O)_3SiCH_2CH_2CH_2]_3C—C({=}O)—O—CH_2—CF_2CF_2CF_2—(OCF_2CF_2—OCF_2CF_2CF_2CF_2)_{x5}—OCF_2CF_2—OCF_2CF_2CF_2CH_2—O—(C{=}O)—C[CH_2CH_2CH_2Si(OCH_3)_3]_3$ Compound (1-E)

In the formula, the average value of x5 is 13.

Example 6

Example 6-1

Compound (F-1) was obtained according to the method described in Example 1-1 of the examples of International Patent Publication No. WO 2013/121984.

$CF_2{=}CF—O—CF_2CF_2CF_2CH_2—OH$ Formula (F-1)

Example 6-2

10 g of compound (F-1) was placed in a 100 mL metal reactor and stirred at 175° C. The obtained organic phase was concentrated to obtain 6 g of compound (F-2).

Formula (F-2)

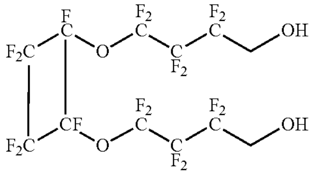

Example 6-3

5 g of compound (F-2) and 1.2 g of potassium carbonate were placed in a 200 mL eggplant flask, the mixture was stirred at 120° C., 25 g of compound (F-2) was added, and the mixture was stirred at 120° C. for 2 hours. The temperature inside the flask was set to 25° C., 30 g of each of AC-2000 and hydrochloric acid were charged into the flask, the solution separated, and the organic phase was concentrated. The obtained crude reaction solution was purified by column chromatography to obtain 21 g of compound (F-3)

Formula (F-3)

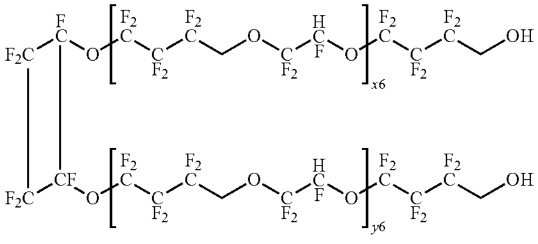

In the formula, the average value of x6+y6 is 10.

Example 6-4

20 g of compound (F-3), 7.1 g of sodium fluoride powder, 20 g of AC-2000, and 20 g of $CF_3CF_2CF_2OCF(CF_3)COF$ were charged into a 50 mL eggplant flask. The mixture was stirred for 24 hours at 50° C. under a nitrogen atmosphere. After setting the inside of the eggplant flask to 25° C., the sodium fluoride powder was removed by filtration, and excess $CF_3CF_2CF_2OCF(CF_3)COF$ and AC-2000 were removed by distillation under reduced pressure to obtain 24 g of compound (F-4).

Formula (F-4)

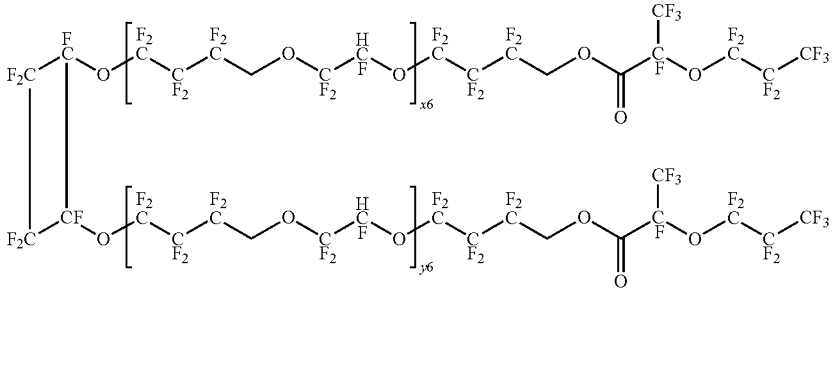

Example 6-5

250 mL of CFE-419 was placed in a 500 mL metal reactor, nitrogen gas was bubbled into the reactor, and then 20% by volume fluorine gas diluted with nitrogen gas was bubbled. A CFE-419 solution of compound (F-4) (concentration: 10% by mass, compound (F-4): 20 g) was added over 3 hours. The ratio of the introduction rate of the fluorine gas (mol/hour) to the introduction rate of hydrogen atoms in compound (4-2) (mol/hour) was controlled to be 2:1. After the addition of compound (F-4) was complete, a CFE-419 solution in benzene (concentration: 0.1%, benzene: 0.1 g) was added intermittently. After the addition of benzene was complete, fluorine gas was bubbled, and finally the inside of the reactor was thoroughly purged with nitrogen gas. The solvent was removed by distillation to obtain 21 g of compound (F-5).

Formula (F-5)

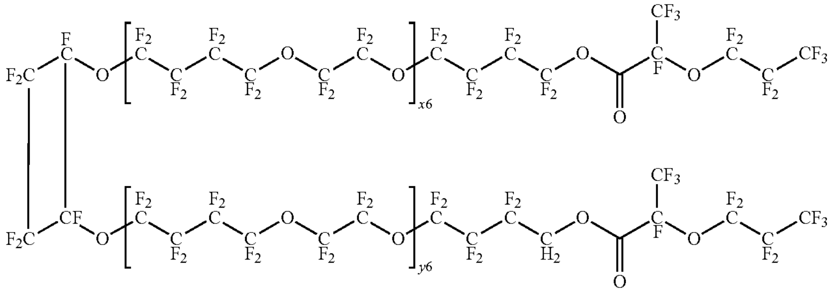

Example 6-6

20 g of compound (F-5), 1.8 g of sodium fluoride, and 20 mL of AC-2000 were placed in a 50 mL eggplant flask and stirred in an ice bath. 1.4 g of methanol was added and the mixture was stirred for 1 hour at 25° C. The mixture was filtered, and the obtained filtrate was purified by column chromatography. 14 g of compound (F-6) was obtained.

Formula (F-6)

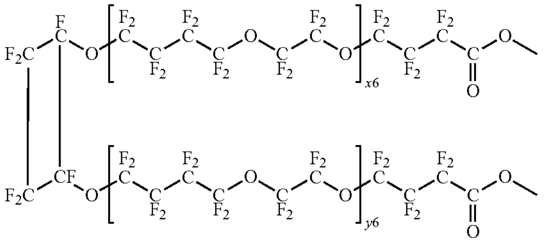

Example 6-7

1.6 g of sodium borohydride powder was placed in a 50 cc three-necked round bottom flask, and 5 g of AC2000 was added thereto. The mixture was stirred while cooling in an ice bath, and a solution obtained by mixing 10 g of compound (F-6), 1.3 g of methanol, and 20 g of AC2000 was slowly added dropwise under a nitrogen atmosphere from a dropping funnel so that the internal temperature did not exceed 10° C. After the total amount had been added dropwise, 1.3 g of methanol was further added dropwise. Then, the mixture was stirred at 10° C. The mixture was again cooled in an ice bath, and an aqueous solution of hydrochloric acid was added dropwise. After the reaction finished, the mixture was successively washed with a hydrochloric acid solution and water, and the organic phase was collected. The collected organic phase was concentrated and distilled under reduced pressure to obtain 9.7 g of compound (F-7).

Formula (F-7)

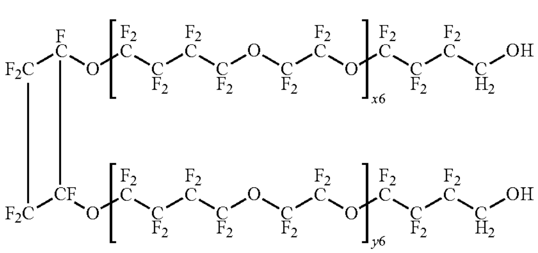

Example 6-8

The following compound (1-F) was obtained by the same method as in Example 5-7 to Example 5-8, except that compound (E-6) in the above Example 5-7 was changed to compound (F-7).

Formula (1-F)

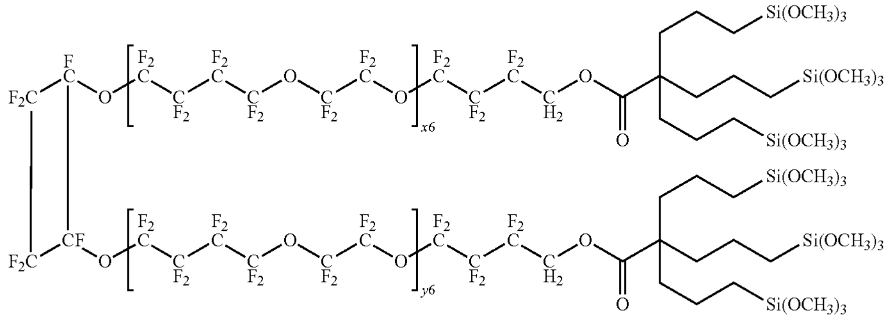

In the formula, the average value of x6+y6 is 10.

Example 7

Example 7-1

Compound (G-1) was synthesized by the same synthesis method as that described in Synthesis Examples 1 to 4 of Japanese Patent No. 6024816.

$CH_3OCOCF_2—(OCF_2)_{x7}—(OCF_2CF_2)_{y7}—OCF_2CO_2CH_3$ Formula (G-1)

Average value of the number of units x7: 42, average value of the number of units y7: 10.

Example 7-2

Compound (G-2) was synthesized according to the method described in (Example 13-1) to (Example 13-2) of International Patent Publication No. WO 2018/216630.

$CF_3CF_2CF_2—O—CHF—CF_2OCH_2CH_2CH_2CH_2CH_2CH_2OTs$ Formula (G-2)

(OTs represents $—O—SO_2$-Ph-$CH_3$, and Ph represents a phenylene group.)

Example 7-3

4 g of compound (G-2), 30 g of compound (G-1), and 160 g of 1,3-bis (trifluoromethyl) benzene were placed in a 300 mL three-necked flask, and 12 g of cesium carbonate was added. The mixture was stirred at 70° C. under a nitrogen atmosphere. The solid was filtered, then washed with water, and the organic phase was collected. The collected organic phase was concentrated under reduced pressure and purified by silica gel column chromatography to obtain 12 g of compound (G-3).

$CF_3CF_2CF_2—O—CHF—CF_2OCH_2CH_2CH_2CH_2CH_2CH_2O—CH_2—CF_2—\{(OCF_2)_{x7}(OCF_2CF_2)_{y7}\}—OCF_2—CH_2—OH$ Formula (G-3)

Average value of the number of units x7: 42, average value of the number of units y7: 10.

Example 7-4

12 g of compound (G-3) and 2.3 g of sodium fluoride powder were placed in a 100 mL eggplant flask, and 11 g of $CF_3CF_2CF_2OCF(CF_3)C(O)F$ was added. The mixture was stirred under a nitrogen atmosphere. The sodium fluoride powder was removed by filtration, and then excess $CF_3CF_2CF_2OCF(CF_3)C(O)F$ was removed by distillation under reduced pressure to obtain 12 g of compound (G-4).

$CF_3CF_2CF_2—O—CHF—CF_2OCH_2CH_2CH_2CH_2CH_2CH_2O—CH_2—CF_2—\{(OCF_2)_{x7}(OCF_2CF_2)_{y7}\}—OCF_2—CH_2—OC(O)CF(CF_3)OCF_2CF_2CF_3$ Formula (G-4)

Average value of the number of units x7: 42, average value of the number of units y7: 10.

Example 7-5

A cooler maintained at 20° C., a NaF pellet packed bed, and a cooler maintained at 0° C. were arranged in series at the gas outlet of a 1 L nickel autoclave. A liquid return line was installed to return aggregated liquid from the cooler maintained at 0° C. to the autoclave.

750 g of CFE-419 was placed in the autoclave and stirred while maintaining at 25° C. Nitrogen gas was blown into the autoclave at 25° C. for 1 hour, and then 20% fluorine gas was blown into the autoclave at 25° C. and a flow rate of 2.0 L/hour for 1 hour. A solution of 6.0 g of compound (G-4) dissolved in 54 g of CFE-419 was charged into the autoclave over 1 hour while blowing 20% fluorine gas at the same flow rate. The internal pressure of the autoclave was raised to 0.15 MPa (gauge pressure) while blowing 20% fluorine gas at the same flow rate. 4 mL of a benzene solution containing 0.05 g/mL of benzene in CFE-419 was charged into the autoclave while heating from 25° C. to 40° C., and the benzene solution inlet of the autoclave was closed. The mixture was stirred, then 4 mL of the benzene solution was again charged while maintaining at 40° C., and the inlet was closed. The same operation was repeated. The total amount of charged benzene was 0.17 g. Stirring was continued while blowing 20% fluorine gas at the same flow rate. The pressure in the autoclave was returned to atmospheric pressure, and nitrogen gas was blown therein. The contents of the autoclave were concentrated on an evaporator to obtain 6.1 g of compound (G-5).

$CF_3CF_2CF_2—O—CF_2—CF_2OCF_2CF_2CF_2CF_2CF_2CF_2O—CF_2—CF_2—\{(OCF_2)_{x7}(OCF_2CF_2)_{y7}\}—OCF_2—CF_2—OC(O)CF(CF_3)OCF_2CF_2CF_3$ Formula (G-5)

Average value of the number of units x7: 42, average value of the number of units y7: 10.

Example 7-6

6.1 g of compound (G-5) and 10 g of AK-225 were placed in a PFA round-bottom flask. The mixture was stirred while cooling in an ice bath, and 10 g of methanol was slowly added dropwise from a dropping funnel under a nitrogen atmosphere. The mixture was stirred for 12 hours. The reaction mixture was concentrated on an evaporator to obtain 5.5 g of compound (G-6).

$CF_3CF_2CF_2—O—CF_2—CF_2OCF_2CF_2CF_2CF_2CF_2CF_2O—CF_2—CF_2—\{(OCF_2)_{x7}(OCF_2CF_2)_{y7}\}—OCF_2—C(O)OCH_3$ Formula (G-6)

Average value of the number of units x7: 42, average value of the number of units y7: 10.

Example 7-7

The following compound (1-G) was obtained by the same method as in Example 1-2 to Example 1-4, except that compound (A-1) in Example 1-2 was changed to compound (G-6).

$CF_3CF_2CF_2—O—CF_2—CF_2OCF_2CF_2CF_2CF_2CF_2CF_2O—CF_2—CF_2—\{(OCF_2)_{x7}(OCF_2CF_2)_{y7}\}—OCF_2—CH_2O(C{=}O)C[CH_2CH_2CH_2Si(OCH_3)_3]_3$ Formula (1-G)

Average value of the number of units x7: 42, average value of the number of units y7: 10.

Example 8

Example 8-1

The following compound (1-H) was synthesized by the same method as in Example 7, except that the $HO(C{=}O)C(CH_2CH{=}CH_2)_3$ in Example 1-3 referred to in Example 7-7 was changed to $HO(C{=}O)CH(CH_2CH{=}CH_2)_2$.

$CF_3CF_2CF_2—O—CF_2—CF_2OCF_2CF_2CF_2CF_2CF_2CF_2O—CF_2—CF_2—\{(OCF_2)_{x8}(OCF_2CF_2)_{y8}\}—OCF_2—CH_2O(C{=}O)CH[CH_2CH_2CH_2Si(OCH_3)_3]_2$ Formula (1-H)

Average value of the number of units x8: 42, average value of the number of units y8: 10.

Example 9

Example 9-1

The following compound (I-2) was obtained by the same method as in Example 7-2 to Example 7-6, except that the following compound (I-1) having a different number of repeating units from compound (G-1) in Example 7-1 was synthesized, and that compound (I-1) was used instead of compound (G-1) in Example 7-3.

$CH_3OCOCF_2—(OCF_2)_{x9}—(OCF_2CF_2)_{y9}—OCF_2CO_2CH_3$ Formula (I-1)

$CF_3CF_2CF_2—O—CF_2—CF_2OCF_2CF_2CF_2CF_2CF_2CF_2O—CF_2—CF_2—\{(OCF_2)_{x9}(OCF_2CF_2)_{y9}\}—OCF_2—C(O)OCH_3$ Formula (I-2)

Average value of the number of units x9: 26, average value of the number of units y9: 22.

Example 9-2

Compound (1-I) was synthesized by the same method as in Example 1-2 to Example 1-4, except that compound A-1 in Example 1-2 was changed to compound I-2.

$CF_3CF_2CF_2—O—CF_2—CF_2OCF_2CF_2CF_2CF_2CF_2CF_2O—CF_2—CF_2—\{(OCF_2)_{x9}(OCF_2CF_2)_{y9}\}—OCF_2—CH_2O(C{=}O)C[CH_2CH_2CH_2Si(OCH_3)_3]_3$ Formula (1-I)

Average value of the number of units x9: 26, average value of the number of units y9: 22.

Example 10

Example 10-1

Compound (1-J) was synthesized by the same method as in Example 7, except that the $HO(C{=}O)C(CH_2CH{=}CH_2)_3$ in Example 1-3 referred to in Example 7-7 was changed to $HO(C{=}O)CH(CH_2CH{=}CH_2)_2$.

$CF_3CF_2CF_2—O—CF_2—CF_2OCF_2CF_2CF_2CF_2CF_2CF_2O—CF_2—CF_2—\{(OCF_2)_{x10}(OCF_2CF_2)_{y10}\}—OCF_2—CH_2O(C{=}O)CH[CH_2CH_2CH_2Si(OCH_3)_3]_2$ Formula (1-J)

Average value of the number of units x10: 26, average value of the number of units y10: 22.

Example 11

Example 11-1

Compound (1-K) was synthesized by the same method as in Example 1-2 to Example 1-4, except that compound (A-1) was changed to compound (K-1) (FLUOROLINK (register trademark) D4000, manufactured by Solvay Solexis).

$HOCH_2CF_2—(OCF_2)_{x11}—(OCF_2CF_2)_{y11}—OCF_2CH_2OH$ Formula (K-1)

$(CH_2{=}CHCH_2)_3C(C{=}O)OCH_2CF_2—(OCF_2)_{x11}—(OCF_2CF_2)_{y11}—OCF_2CH_2O(C{=}O)C[CH_2CH_2CH_2Si(OCH_3)_3]_3$ Formula (1-K)

Average value of the number of units x11: 16, average value of the number of units y11: 18.

Example 12

Example 12-1

7 g of compound A-2, 7 g of AC6000, 0.4 g of triethylamine, and 0.2 g of N,N-dimethyl-4-aminopyridine were charged into a 50 cc eggplant flask, 0.6 g of acryloyl chloride was added, and the mixture was stirred at 30° C.

The resulting crude product was purified by silica gel chromatography to obtain 5.8 g of compound (L-1).

$CF_3O(CF_2CF_2OCF_2CF_2CF_2CF_2O)_{x12}CF_2CF_2OCF_2CF_2CF_2—CH_2O(C{=}O)CCH{=}CH_2$ Formula (L-1)

Average value of the number of units x12: 13.

Example 12-2

20 g of compound L-1, 20 g of 1,3-bis(trifluoromethyl) benzene, 0.06 g of triacetoxymethylsilane, and 1.36 g of trichlorosilane were charged into a 100 mL four-necked flask equipped with a reflux condenser, a thermometer, and a stirrer, and the mixture was stirred at 5° C. for 30 minutes under a nitrogen stream. Next, 0.094 ml of a solution including 2% of a Pt complex of 1,3-divinyl-1,1,3,3-tetramethyldisiloxane in xylene was added, then the temperature was increased to 60° C., and the mixture was stirred at this temperature for 5 hours. Then, the volatile component was removed by distillation under reduced pressure to obtain 19 g of compound (L-2).

$CF_3O(CF_2CF_2OCF_2CF_2CF_2CF_2O)_{x12}CF_2CF_2OCF_2CF_2CF_2—CH_2O(C{=}O)CCH_2CH_2SiCl_3$ Formula (L-2)

Example 12-3

19 g of compound L-2 and 20 g of 1,3-bis (trifluoromethyl)benzene were charged into in a 100 mL four-necked flask equipped with a reflux condenser, a thermometer and a stirrer, and the mixture was stirred for 30 minutes at 5° C. under a nitrogen stream. Next, 26.4 ml of a solution containing 0.7 mol/L of allylmagnesium bromide in diethyl ether was added, the temperature was raised to room temperature, and the mixture was stirred at this temperature for 10 hours.

Then, the mixture was cooled to 5° C., 5 ml of methanol was added, the temperature was raised to room temperature, and the insoluble material was filtered. Next, the volatile component was removed by distillation under reduced pressure, the non-volatile component was diluted with perfluorohexane, and a washing operation with methanol in a liquid separation funnel (more specifically, an operation which maintained the fluoro-based compound in the perfluorohexane phase (fluorous phase) and separated and removed the non-fluoro-based compound into the methanol phase (organic phase)) was carried out. Next, the volatile component was removed by distillation under reduced pressure to obtain 20 g of compound L-3.

$CF_3O(CF_2CF_2OCF_2CF_2CF_2CF_2O)_{x12}$
$CF_2CF_2OCF_2CF_2CF_2—CH_2O(C{=}O)$
$CCH_2CH_2Si(CH_2CH{=}CH_2)_3$ Formula (L-3)

Example 12-4

15 g of compound (L-3), 15 g of 1,3-bis(trifluoromethyl) benzene, 0.05 g of triacetoxymethylsilane, and 3.15 g of trichlorosilane were charged into a 100 mL four-necked flask equipped with a reflux condenser, a thermometer, and a stirrer, and the mixture was stirred at 5° C. for 30 minutes under a nitrogen stream. Next, 0.141 ml of a solution including 2% of a Pt complex of 1,3-divinyl-1,1,3,3-tetramethyldisiloxane in xylene was added, then the temperature was increased to 60° C., and the mixture was stirred at this temperature for 5 hours. Then, the volatile component was removed by distillation under reduced pressure to obtain 16 g of compound (L-4).

$CF_3O(CF_2CF_2OCF_2CF_2CF_2CF_2O)_{x12}$
$CF_2CF_2OCF_2CF_2CF_2—CH_2O(C{=}O)$
$CCH_2CH_2Si(CH_2CH_2CH_2SiCl_3)_3$ Formula (L-4)

Example 12-5

15 g of compound (L-4), 15 g of 1,3-bis(trifluoromethyl) benzene, and 0.05 g of triacetoxymethylsilane were charged into a 100 mL four-necked flask equipped with a reflux condenser, a thermometer, and a stirrer, and the mixture was stirred at 50° C. for 30 minutes under a nitrogen stream. Next, a mixed solution of 0.5 g of methanol and 7.8 g of trimethyl orthoformate was added, and the mixture was stirred for 2 hours. Then, the volatile component was removed by distillation under reduced pressure to obtain 15 g of compound (1-L).

$CF_3O(CF_2CF_2OCF_2CF_2CF_2CF_2O)_{x12}$
$CF_2CF_2OCF_2CF_2CF_2—CH_2O(C{=}O)$
$CCH_2CH_2Si[CH_2CH_2CH_2Si(OCH_3)]_3$ Formula (1-L)

Average value of the number of units x12: 13.

Example 13

Example 13-1

Compound (M-1) was obtained according to the method described in Example 14-5 of the examples of International Patent Publication No. WO 2017/038830.

$CF_3OCF_2CF_2O—CF_2CF_2CF_2CF_2CF_2CF_2O$
$(CF_2CF_2O—CF_2CF_2CF_2CF_2O)_{x13}$
$CF_2CF_2OCF_2CF_2CF_2C(O)OCH_3$ Formula (M-1)

Average value of the number of units x13: 9.

Example 13-2

40 g of compound M-1 and 25 g of a solution of allylmagnesium bromide in diethyl ether (bromo group concentration 0.05 mol/100 g), 40 g of 1,3-bistrifluoromethylbenzene, and 13 g of tetrahydrofuran were charged into a 300 mL four-necked flask equipped with a Dimroth condenser, a dropping funnel, a thermometer, and a magnetic stirrer, and the inside of the flask was purged with nitrogen. The mixture was reacted at an internal temperature of 60° C. for 6 hours while stirring, and cooled to room temperature (20° C.). Then, the reaction solution was slowly added to a liquid separation funnel containing aqueous hydrochloric acid (aqueous hydrochloric acid in which 6 g of 12N hydrochloric acid is mixed in 54 g of water), the mixture was stirred for 30 minutes, and then the lower layer was collected. The solvent component was removed from the recovered liquid under conditions of 110° C./1 mmHg to obtain 35 g of compound (M-2).

$CF_3OCF_2CF_2O—CF_2CF_2CF_2CF_2CF_2CF_2O$
$(CF_2CF_2O—CF_2CF_2CF_2CF_2O)_{x13}CF_2$
$CF_2OCF_2CF_2CF_2C(OH)(CH_2CH{=}CH_2)_2$ Formula (M-2)

Example 13-3

0.67 g of $HO(C{=}O)C(CH_2CH{=}CH_2)_3$, 33 mL of dichloromethane, and 0.67 mL of oxalyl chloride were charged into a 200 cc eggplant flask. The resulting mixture was stirred under ice cooling, and then 0.0393 g of DMF (N,N-dimethylformamide) was added. After that, the mixture was stirred at room temperature for 3 hours, and then concentrated to obtain 0.6 g of $Cl(C{=}O)C(CH_2CH{=}CH_2)_3$.

7 g of compound (M-2), 7 g of AC6000, 0.4 g of triethylamine, and 0.2 g of N,N-dimethyl-4-aminopyridine were charged into a separate 50 cc eggplant flask, 0.6 g of the above $Cl(C{=}O)C(CH_2CH{=}CH_2)_3$ was added, and the mixture was stirred at 60° C. for 20 hours.

The resulting crude product was purified by silica gel chromatography to obtain 5.8 g of compound (M-3).

$CF_3OCF_2CF_2O—CF_2CF_2CF_2CF_2CF_2CF_2O$
$(CF_2CF_2O—CF_2CF_2CF_2CF_2O)_{x13}$
$CF_2CF_2OCF_2CF_2CF_2C[O(C{=}O)C$
$(CH_2CH{=}CH_2)_3](CH_2CH{=}CH\ 2)_2$ Formula (M-3)

Example 13-4

1.0 g of compound (M-3), 0.003 g of a solution of a platinum/1,3-divinyl-1,1,3,3-tetramethyldisiloxane complex in xylene (platinum content: 3% by mass), 0.0009 g of aniline, and 1.0 g of AC6000 were charged into a 50 cc eggplant flask that had been purged with nitrogen, then 0.22 g of trimethoxysilane was added, and the mixture was stirred at 40° C. for 4 hours. After further adding the same amount of the solution of the platinum/1,3-divinyl-1,1,3,3-tetramethyldisiloxane complex in xylene (platinum content: 3% by mass), aniline, and AC6000 and stirring for 7 hours, the solvent was removed by distillation to obtain 1.1 g (yield 95%) of compound (1-M).

$CF_3OCF_2CF_2O—CF_2CF_2CF_2CF_2CF_2CF_2O$
$(CF_2CF_2O—CF_2CF_2CF_2CF_2O)_{x13}$
$CF_2CF_2OCF_2CF_2CF_2C[O(C{=}O)C$
$(CH_2CH_2CH_2Si(OCH_3)_3)_3](CH_2CH_2CH_2Si$
$(OCH_3)_3)_2$ Formula (1-M)

Average value of the number of units of x13: 9.

Example 14

Example 14-1

Compound (1-N) was synthesized by the same method as in Example 13-3 to Example 13-4, except that the $HO(C{=}O)C(CH_2CH{=}CH_2)_3$ in Example 13-3 was changed to $HO(C{=}O)CH(CH_2CH{=}CH_2)_2$.

$CF_3OCF_2CF_2O—CF_2CF_2CF_2CF_2CF_2CF_2O(CF_2CF_2O—CF_2CF_2CF_2CF_2O)_{x14}CF_2CF_2OCF_2CF_2CF_2C[O(C{=}O)CH(CH_2CH_2CH_2Si(OCH_3)_3)_2](CH_2CH_2CH_2Si(OCH_3)_3)_2$ Formula (1-N)

Average value of the number of units of x14: 9.

Example 15

Example 15-1

Compound (1-0) was synthesized by the same method as in Example 13-3 to Example 13-4, except that the $HO(C{=}O)C(CH_2CH{=}CH_2)_3$ in Example 13-3 was changed to $HO(C{=}O)CH_2CH{=}CH_2$.

$CF_3OCF_2CF_2O—CF_2CF_2CF_2CF_2CF_2CF_2O(CF_2CF_2O—CF_2CF_2CF_2CF_2O)_{x15}CF_2CF_2OCF_2CF_2CF_2C[O(C{=}O)CH_2CH_2CH_2Si(OCH_3)_3](CH_2CH_2CH_2Si(OCH_3)_3)_2$ Formula (1-O)

Average value of the number of units of x15: 9.

Example 16

Example 16-1

Compound (1-P) was synthesized by the same method as in Example 13-1 to Example 13-4, except that compound M-1 in Example 13-2 was changed to compound (G-1).

$CF_3CF_2CF_2—O—CF_2—CF_2OCF_2CF_2CF_2CF_2CF_2CF_2O—CF_2—CF_2—\{(OCF_2)_{x16}(OCF_2CF_2)_{y16}\}—OCF_2—C[O(C{=}O)C(CH_2CH_2CH_2Si(OCH_3)_3)_3](CH_2CH_2CH_2Si(OCH_3)_3)_2$ Formula (1-P)

Average value of x16: 26, average value of y16: 22.

Example 17

Example 17-1

Compound (1-Q) was synthesized by the same method as in Example 14, except that compound M-1 in Example 14 was changed to compound (G-1).

$CF_3CF_2CF_2—O—CF_2—CF_2OCF_2CF_2CF_2CF_2CF_2CF_2O—CF_2—CF_2—\{(OCF_2)_{x17}(OCF_2CF_2)_{y17}\}—OCF_2—C[O(C{=}O)CH(CH_2CH_2CH_2Si(OCH_3)_3)_2](CH_2CH_2CH_2Si(OCH_3)_3)_2$ Formula (1-Q)

Average value of x17: 26, average value of y17: 22.

Example 18

Example 18-1

Compound (1-R) was synthesized by the same method as in Example 15, except that compound M-1 in Example 15-1 was changed to compound (G-1).

$CF_3CF_2CF_2—O—CF_2—CF_2OCF_2CF_2CF_2CF_2CF_2CF_2O—CF_2—CF_2—\{(OCF_2)_{x18}(OCF_2CF_2)_{y18}\}—OCF_2—C[O(C{=}O)CH_2CH_2CH_2Si(OCH_3)_3](CH_2CH_2CH_2Si(OCH_3)_3)_2$ Formula (1-R)

Average value of x18: 26, average value of y18: 22.

Example 19

Example 19-1

3.0 g of the following compound (S-1), 0.55 g of $HO—CH_2C(CH_2CH{=}CH_2)_3$, 0.14 g of NaF, and 3.0 g of AC2000 were charged into a 50 ml eggplant flask, and the mixture was stirred at 30° C. for 5 hours. The resulting crude product was purified by silica gel chromatography to obtain 2.5 g of the following compound (S-2).

$CF_3(OCF_2CF_2OCF_2CF_2CF_2CF_2)_{x19}OC({=}O)CF(CF_3)OCF_2CF_2CF_3$ Formula (S-1)

$CF_3(OCF_2CF_2OCF_2CF_2CF_2CF_2)_{x19}OCF_2CF_2OCF_2CF_2CF_2C({=}O)OCH_2C(CH_2CH{=}CH_2)_3$ Formula (S-2)

Average value of x19: 13.

Example 19-2

1.0 g of compound (S-2), 0.003 g of a solution of a platinum/1,3-divinyl-1,1,3,3-tetramethyldisiloxane complex in xylene (platinum content: 3% by mass), 0.0009 g of aniline, and 1.0 g of AC6000 were charged into a 50 cc eggplant flask that had been purged with nitrogen, then 0.11 g of trimethoxysilane was added, and the mixture was stirred at 40° C. for 4 hours. After further adding the same amount of the solution of the platinum/1,3-divinyl-1,1,3,3-tetramethyldisiloxane complex in xylene (platinum content: 3% by mass), aniline, and AC6000 and stirring for 7 hours, the solvent was removed by distillation to obtain 1.1 g (yield 95%) of compound (1-S).

$CF_3(OCF_2CF_2OCF_2CF_2CF_2CF_2)_{x190}CF_2CF_2OCF_2CF_2CF_2C({=}O)OCH_2C(CH_2CH_2CH_2Si(OCH_3)_3)_3$ Formula (1-S)

Average value of x19: 13.

Example 20

Example 20-1

Compound (X-1) was obtained according to the method described in the comparative example of Japanese Unexamined Patent Application Publication No. 2007-204586.

$F(CF_2CF_2CF_2O)_{x20}CF_2CF_2COF$ Formula (X-1)

Average value of x20: 26.

Example 20-2

20 g of compound (X-1), 1.8 g of sodium fluoride, and 20 mL of AC-2000 were placed in a 50 mL eggplant flask and stirred in an ice bath. 1.4 g of methanol was added and the mixture was stirred for 1 hour at 25° C. The mixture was filtered, and the obtained filtrate was purified by column chromatography to obtain 14 g of compound (X-2).

$F(CF_2CF_2CF_2O)_{x20}CF_2CF_2C({=}O)OCH_3$ Formula (X-2)

The average value of x20 is 26.

Example 20-3

The following compound (1-X) was obtained by the same method as in Example 1, except that compound (A-1) in the above Example 1-2 was changed to compound (X-2).

$$F(CF_2CF_2CF_2O)_{x20}CF_2CF_2CH_2O(C{=}O)C[CH_2CH_2CH_2Si(OCH_3)_3]_3 \quad \text{Formula (1-X)}$$

The average value of x20: is 26.

Example 21

Example 21-1

20 g of CHMINOX PO-M-AF manufactured by Unimatec, 1.8 g of sodium fluoride, and 20 mL of AC-2000 were placed in a 50 mL eggplant flask and stirred in an ice bath. 1.8 g of methanol was added and the mixture was stirred for 1 hour at 25° C. The mixture was filtered, and the obtained filtrate was purified by column chromatography. 14 g of compound (Y-1) was obtained.

$$CF_3CF_2CF_2O(CF(CF_3)CF_2O)_{x21}CF(CF_3)C({=}O)OCH_3 \quad \text{Formula (Y-1)}$$

The average value of x21: 14.

Example 21-2

The following compound (1-Y) was obtained by the same method as in Example 1, except that compound (A-1) in the above Example 1-2 was changed to compound (Y-1).

$$CF_3CF_2CF_2O(CF(CF_3)CF_2O)_{x21}CF(CF_3)CH_2O(C{=}O)C[CH_2CH_2CH_2Si(OCH_3)_3]_3 \quad \text{Formula (1-Y)}$$

The average value of x21: 14.

[Production and Evaluation of Article]

Articles were obtained using the compounds obtained in Examples 1 to 21 and surface-treating the substrate. As the surface treatment method, in each example the following dry coating and wet coating method were performed. As the substrate, chemically strengthened glass was used. The obtained articles were evaluated based on the following methods. The results are shown in Table 1.

(Dry Coating Method)

The dry coating was carried out using a vacuum vapor deposition apparatus (manufactured by ULVAC Inc., VTR-350M) (vacuum vapor deposition method). 0.5 g of each of the compounds obtained in Examples 1 to 21 was filled in a boat made of molybdenum in the vacuum vapor deposition apparatus, and the inside of the vacuum vapor deposition apparatus was evacuated to $1\times10^{-3}$ Pa or lower. The boat in which the compound had been placed was heated at a rate of temperature increase of 10° C./min or lower, and at the point when the vapor deposition rate by a quartz oscillator film thickness meter exceeded 1 nm/sec, the shutter was opened to start film deposition on the surface of the substrate. When the film thickness reached about 50 nm, the shutter was closed to end film deposition on the surface of the substrate. The substrate on which the compound had been deposited was heat treated at 200° C. for 30 minutes, and then washed with dichloropentafluoropentane (manufactured by AGC Inc., AK-225) to obtain an article having a surface layer on the surface of the substrate.

(Wet Coating Method)

Each of the compounds obtained in Examples 1 to 21 was mixed with $C_4F_9OC_2H_5$ (manufactured by 3M, Novec (register trademark) 7200) as a medium to prepare a coating liquid having a solid content concentration of 0.05%. The substrate was dipped in the coating liquid, allowed to stand for 30 minutes, and then the substrate was taken out (dip coating method). The coating film was dried at 200° C. for 30 minutes and washed with AK-225 to obtain an article having a surface layer on the surface of the substrate.

(Evaluation Methods)

<Method for Measuring Contact Angle>

The contact angle of about 2 μL of distilled water or n-hexadecane placed on the surface of the surface layer was measured using a contact angle measuring apparatus (manufactured by Kyowa Interface Science Co., Ltd., DM-500). Five different locations on the surface of the surface layer were measured, and the average value thereof was calculated. For the calculation of the contact angle, a 2θ method was employed.

<Abrasion Resistance (Steel Wool)>

Steel wool Bon Star (#0000) was rubbed back-and-forth over the surface layer 15,000 times under a pressure of 98.07 kPa at a speed of 320 cm/min in accordance with JIS L0849: 2013 (ISO 105-X12: 2001) using a reciprocating traverse testing machine (manufactured by KNT), and then the water contact angle was measured by the methods described above. The smaller the decrease in water repellency (water contact angle) after the rubbing, the smaller the decrease in performance due to abrasion, and the better the abrasion resistance. The evaluation criteria were as follows.

- Double circle (very good): Change in water contact angle after being rubbed back-and-forth 15,000 times of 2 degrees or less
- Circle (good): Change in water contact angle after being rubbed back-and-forth 15,000 times of more than 2 degrees and 5 degrees or less
- Triangle (acceptable): Change in water contact angle after being rubbed back-and-forth 15,000 times of more than 5 degrees and 10 degrees or less
- Cross (not acceptable): Change in water contact angle after being rubbed back-and-forth 15,000 times exceeding 10 degrees <Acid Resistance+Abrasion Resistance (Steel Wool)>

The article was dipped in a 5 N, 60° C. hydrochloric acid solution (acid treated) for 5 hours, then washed with water, air-dried, and then subjected to the above-described steel wool test. A smaller decrease in the water contact angle after the test indicates a smaller decrease in performance due to the acid and better acid resistance. The evaluation criteria are as follows.

- Double circle (very good): Change in water contact angle after acid treatment and being rubbed back-and-forth 15,000 times of 2 degrees or less
- Circle (good): Change in water contact angle after acid treatment and being rubbed back-and-forth 15,000 times of more than 2 degrees and 5 degrees or less
- Triangle (acceptable): Change in water contact angle after acid treatment and being rubbed back-and-forth 15,000 times of more than 5 degrees and 10 degrees or less
- Cross (not acceptable): Change in water contact angle after acid treatment and being rubbed back-and-forth 15,000 times exceeding 10 degrees <Fingerprint Stain Removability>

An artificial fingerprint solution (a liquid consisting of oleic acid and squalene) was attached to a flat surface of a silicon rubber stopper, excess oil was then wiped off with a nonwoven fabric (Bemcot (register trademark) M-3, manufactured by Asahi Kasei Corporation) to prepare a fingerprint stamp. The fingerprint stamp was placed on the surface layer, and pressed at a load of 9.8 N for 10 seconds. The haze at the place where the fingerprint adhered was measured with a haze meter, and taken as an initial value. The place where the fingerprint adhered was wiped at a load of 4.9 N with a reciprocating traverse tester (manufactured by KNT) in which tissue paper had been attached. The haze value was measured for each round-trip wipe, and the number of wipes at which the haze decreased 10% or less from the initial value was measured. Fewer wipes indicates that it is easier to remove the fingerprint stain, and hence fingerprint stain wiping property is better. The evaluation criteria are as follows.

Double circle (very good): 3 or less wipes

Circle (good): 4 or 5 wipes

Triangle (acceptable): 6 to 8 wipes

Cross (not acceptable): 9 or more wipes

[Table 1]

| Compound | Type | Example 1<br>1-A | 2<br>1-B | 3<br>1-C | 4<br>1-D | 5<br>1-E | 6<br>1-F | 7<br>1-G | 8<br>1-H | 9<br>1-I | 10<br>1-J | 11<br>1-K |
|---|---|---|---|---|---|---|---|---|---|---|---|---|
| Dry coating | Initial contact angle Water | ◎ | ◎ | ◎ | ◎ | ◎ | ◎ | ◎ | ◎ | ◎ | ◎ | ◎ |
| | Abrasion resistance | ◎ | ○ | ◎ | ○ | ◎ | ◎ | ◎ | ◎ | ◎ | ◎ | ◎ |
| | Acid resistance + abrasion resistance | ○ | ○ | ○ | ○ | ○ | ○ | ○ | ○ | ○ | ○ | ○ |
| | Fingerprint stain removability | ◎ | ◎ | ◎ | ◎ | ○ | ○ | ◎ | ◎ | ◎ | ◎ | ○ |
| Wet coating | Initial contact angle Water | ◎ | ◎ | ◎ | ◎ | ◎ | ◎ | ◎ | ◎ | ◎ | ◎ | ◎ |
| | Abrasion resistance | ◎ | ○ | ◎ | ○ | ◎ | ◎ | ◎ | ◎ | ◎ | ◎ | ◎ |
| | Acid resistance | ○ | ○ | ○ | ○ | ○ | ○ | ○ | ○ | ○ | ○ | ○ |
| | Fingerprint stain removability | ◎ | ◎ | ◎ | ◎ | ○ | ○ | ◎ | ◎ | ◎ | ◎ | ○ |

| Compound | Type | Example 12<br>1-L | 13<br>1-M | 14<br>1-N | 15<br>1-O | 16<br>1-P | 17<br>1-Q | 18<br>1-R | 19<br>1-S | 20<br>1-X | 21<br>1-Y |
|---|---|---|---|---|---|---|---|---|---|---|---|
| Dry coating | Initial contact angle Water | ◎ | ◎ | ◎ | ◎ | ◎ | ◎ | ◎ | ◎ | ◎ | ◎ |
| | Abrasion resistance | ○ | ◎ | ◎ | ◎ | ◎ | ◎ | ◎ | ○ | ○ | ○ |
| | Acid resistance + abrasion resistance | ○ | ○ | ○ | ○ | ○ | ○ | ○ | x | ○ | ○ |
| | Fingerprint stain removability | ◎ | ◎ | ◎ | ◎ | ◎ | ◎ | ◎ | ◎ | ◎ | ○ |
| Wet coating | Initial contact angle Water | ◎ | ◎ | ◎ | ◎ | ◎ | ◎ | ◎ | ◎ | ◎ | ◎ |
| | Abrasion resistance | ○ | ◎ | ◎ | ◎ | ◎ | ◎ | ◎ | ○ | ○ | ○ |
| | Acid resistance | ○ | ○ | ○ | ○ | ○ | ○ | ○ | x | ○ | ○ |
| | Fingerprint stain removability | ◎ | ◎ | ◎ | ◎ | ◎ | ◎ | ◎ | ◎ | ◎ | ○ |

As shown in Table 1, the fluorine-containing ether compounds of Examples 1 to 18, which have a polyfluoropolyether chain, a reactive silyl group, and a linking group including a group represented by *—O—C(=O)—**, in which the polyfluoropolyether chain arranged on the * side and the reactive silyl group arranged on the  side are linked via the linking group, exhibited better acid resistance in particular compared with the fluorine-containing ether compounds of Example 19, which has a structure in which the polyfluoropolyether chain arranged on the  side and the reactive silyl group arranged on the * side are linked. Thus, it is clear that the present compound can form a surface layer having excellent chemical stability and excellent durability.

An article having a surface layer that includes the present compound is useful for, for example, an optical article, a touch panel, an anti-reflective film, an anti-reflective glass, a $SiO_2$ treated glass, a tempered glass, a sapphire glass, a quartz substrate, a mold metal, and the like, which are used as a part of a component of the following products.

Products: Car navigation systems, mobile phones, digital cameras, digital video cameras, portable information terminals (PDAs), portable audio players, car audio systems, gaming consoles, eyeglass lenses, camera lenses, lens filters, sunglasses, medical devices (stomach cameras, etc.), copiers, personal computers (PCs), liquid crystal displays, OLED displays, plasma displays, touch panel displays, protective films, anti-reflective films, anti-reflective glass, nanoimprint templates, molds, and the like.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fluorine-containing ether compound represented by the following formula 1, $$R^f[—R^1—O—C(=O)\text{-}Q^1\{\text{-}T\}_g]_j \quad \text{Formula 1}$$

wherein $R^f$ is a polyfluoropolyether chain in which at least one fluorine atom is bonded to a carbon atom bonded to $R^1$, $R^1$ is an alkylene group having 1 to 10 carbon atoms optionally having a substituent (other than a fluorine atom), and a plurality of $R^1$ may be the same or different, $Q^1$ is a (g+1)-valent organic group having a carbon atom bonded to —O—C(=O)— in formula 1, and when there are a plurality of $Q^1$, the plurality of $Q^1$ may be the same or different, T is —$Si(R)_{3-a}(L)_a$, and when there are two or more T, the two or more T may be the same or different, R is an alkyl group, L is a hydrolyzable group or a hydroxyl group, and two or more L in T may be the same or different, a is 2 or 3, g is an integer of 1 or more, and when there are a plurality of g, the plurality of g may be the same or different, and j is 1 or 2.

2. The fluorine-containing ether compound according to claim 1, wherein $Q^1$ is represented by any of the following formulas (Q1) to (Q7):

Formula (Q1)

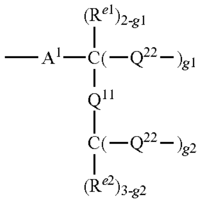

$-A^1-C(R^{e2})_{3-g3}(-Q^{22}-)_{g3}$ Formula (Q2)

$-A^2-N(-Q^{23}-)_2$ Formula (Q3)

$-A^3-Z^1(-Q^{24}-)_{g4}$ Formula (Q4)

$-A^2-Si(R^{e3})_{3-g3}(-Q^{25}-)_{g3}$ Formula (Q5)

$-A^1-Q^{26}-$ Formula (Q6)

$-A^1-CH(-Q^{22}-)—Si(R^{e3})_{3-g5}(-Q^{25}-)_{g5}$ Formula (Q7)

wherein, in formulas (Q1) to (Q7), the $A^1$, $A^2$, or $A^3$ side is linked to —O—C(═O)— in formula 1, and the $Q^{22}$, $Q^{23}$, $Q^{24}$, $Q^{25}$, or $Q^{26}$ side is linked to T, $A^1$ is a single bond, an alkylene group, or a group having —C(O)NR$^{e6}$—, —C(O)—, —NR$^{e6}$—, or —O— between carbon-carbon atoms of an alkylene group having two or more carbon atoms, $A^2$ is an alkylene group or a group having —C(O)NR$^{e6}$—, —C(O)—, —NR$^{e6}$—, or —O-between carbon-carbon atoms of an alkylene group having two or more carbon atoms, $A^3$ is $A^1$ when the atom in $Z^1$ to which $A^3$ is bonded is a carbon atom, and is $A^2$ when the atom in $Z^1$ to which $A^3$ is bonded is a nitrogen atom, $Q^{11}$ is a single bond, —O—, an alkylene group, a group having —C(O)NR$^{e6}$—, —C(O)—, —NR$^{e6}$—, or —O-between carbon-carbon atoms of an alkylene group having two or more carbon atoms, $Q^{22}$ is an alkylene group, a group having —C(O)NR$^{e6}$—, —C(O)—, —NR$^{e6}$—, or —O-between carbon-carbon atoms of an alkylene group having two or more carbon atoms, a group having-C(O)NR$^{e6}$—, —C(O)—, —NR$^{e6}$—, or —O— at an end on the side not linked to the T of the alkylene group, or a group having —C(O)NR$^{e6}$—, —C(O)—, —NR$^{e6}$—, or —O— between carbon-carbon atoms of an alkylene group having two or more carbon atoms and having —C(O)NR$^{e6}$—, —C(O)—, —NR$^{e6}$—, or —O— at an end on the side not linked to the T of the alkylene group, and when $Q^1$ has two or more $Q^{22}$, the two or more $Q^{22}$ may be the same or different, $Q^{23}$ is an alkylene group or a group having —C(O)NR$^{e6}$, —C(O)—, —NR$^{e6}$—, or —O— between carbon-carbon atoms of an alkylene group having two or more carbon atoms, and the two $Q^{23}$ may be the same or different, $Q^{24}$ is $Q^{22}$ when the atom in $Z^1$ to which $Q^{24}$ is bonded is a carbon atom, is $Q^{23}$ when the atom in $Z^1$ to which $Q^{24}$ is bonded is a nitrogen atom, and when $Q^1$ has two or more $Q^{24}$, the two or more $Q^{24}$ may be the same or different, $Q^{25}$ is an alkylene group or a group having —C(O)NR$^{e6}$—, —C(O)—, —NR$^{e6}$—, or —O— between carbon-carbon atoms of an alkylene group having two or more carbon atoms, and when $Q^1$ has two or more $Q^{25}$, the two or more $Q^{25}$ may be the same or different, $Q^{26}$ is an alkylene group or a group having —C(O)NR$^{e6}$—, —C(O)—, —NR$^{e6}$—, or —O— between carbon-carbon atoms of an alkylene group having two or more carbon atoms, $Z^1$ is a (g4+1)-valent group having a ring structure having a carbon atom or nitrogen atom to which $A^3$ is directly bonded and a carbon atom or nitrogen atom to which $Q^{24}$ is directly bonded, $R^{e1}$ is a hydrogen atom or an alkyl group, and when $Q^1$ has two or more Rel, the two or more $R^{e1}$ may be the same or different, $R^{e2}$ is a hydrogen atom, a hydroxyl group, an alkyl group, or an acyloxy group, $R^{e3}$ is an alkyl group, $R^{e6}$ is a hydrogen atom, an alkyl group having 1 to 6 carbon atoms, or a phenyl group, g1 is an integer from 0 to 3, g2 is an integer from 0 to 3, and g1+g2 is an integer from 1 to 6, g3 is an integer from 1 to 3, g4 is an integer greater than or equal to one, and g5 is an integer from 0 to 3.

3. A surface treatment agent comprising the fluorine-containing ether compound according to claim 1.

4. A fluorine-containing ether composition comprising:

one or more of the fluorine-containing ether compounds according to claim 1; and an additional fluorine-containing ether compound.

5. A coating liquid comprising:

the fluorine-containing ether compound according to claim 1; and a liquid medium.

6. An article comprising a surface layer formed from the fluorine-containing ether compound according to claim 1.

7. A method for producing an article, comprising forming a surface layer by a dry coating method or a wet coating method using the fluorine-containing ether compound according to claim 1.

* * * * *